(12) United States Patent
Mukund

(10) Patent No.: US 11,494,473 B2
(45) Date of Patent: Nov. 8, 2022

(54) HEADSET FOR ACOUSTIC AUTHENTICATION OF A USER

(71) Applicant: Plantronics, Inc., Santa Cruz, CA (US)

(72) Inventor: Shridhar K Mukund, San Jose, CA (US)

(73) Assignee: PLANTRONICS, INC., Santa Cruz, CA (US)

( * ) Notice: Subject to any disclaimer, the term of this patent is extended or adjusted under 35 U.S.C. 154(b) by 459 days.

(21) Appl. No.: 16/614,764

(22) PCT Filed: May 18, 2018

(86) PCT No.: PCT/US2018/033455
§ 371 (c)(1),
(2) Date: Nov. 18, 2019

(87) PCT Pub. No.: WO2018/213746
PCT Pub. Date: Nov. 22, 2018

(65) Prior Publication Data
US 2020/0184057 A1 Jun. 11, 2020

Related U.S. Application Data

(60) Provisional application No. 62/508,959, filed on May 19, 2017.

(51) Int. Cl.
*G06F 21/32* (2013.01)
*G10L 17/06* (2013.01)
(Continued)

(52) U.S. Cl.
CPC .............. *G06F 21/32* (2013.01); *G10L 17/00* (2013.01); *G10L 17/06* (2013.01);
(Continued)

(58) Field of Classification Search
USPC ................................ 704/246, 247, 251, 252
See application file for complete search history.

(56) References Cited

U.S. PATENT DOCUMENTS

| 5,787,187 A | 7/1998 | Bouchard et al. |
|---|---|---|
| 6,697,299 B2 * | 2/2004 | Kato ........................ G07C 9/37 367/136 |
| 2004/0215968 A1 | 10/2004 | Rodwell et al. |
| 2008/0262382 A1 | 10/2008 | Akkermans et al. |

(Continued)

OTHER PUBLICATIONS

International Search Report and Written Opinion, dated Oct. 23, 2018 for PCT/US2018/033455 (12 pages).

(Continued)

*Primary Examiner* — Leonard Saint Cyr
(74) *Attorney, Agent, or Firm* — Slayden Grubert Beard PLLC

(57) ABSTRACT

A headset for acoustic authentication of a user is provided, the headset comprising at least a first microphone, a second microphone, a controllable filter, and an authenticator. The first microphone is arranged to obtain a first input signal. The second microphone is arranged to obtain a second input signal. The controllable filter is configured to receive the first input signal and the second input signal and to determine at least one filter transfer function from the received first input signal and the second input signal. The authenticator is configured to determine a current user acoustic signature from the at least one filter transfer function and to compare the current user acoustic signature with a predefined user acoustic signature and to authenticate the user based on the comparison of the current user acoustic signature with the predefined user acoustic signature.

20 Claims, 9 Drawing Sheets

(51) Int. Cl.
*G10L 21/0232* (2013.01)
*G10L 21/0272* (2013.01)
*H04R 1/08* (2006.01)
*H04R 1/10* (2006.01)
*H04R 1/40* (2006.01)
*H04R 3/00* (2006.01)
*H04W 12/06* (2021.01)
*G10L 17/00* (2013.01)
*G10L 21/0216* (2013.01)

(52) U.S. Cl.
CPC ...... *G10L 21/0232* (2013.01); *G10L 21/0272* (2013.01); *H04R 1/08* (2013.01); *H04R 1/1041* (2013.01); *H04R 1/406* (2013.01); *H04R 3/005* (2013.01); *H04W 12/06* (2013.01); *G10L 2021/02165* (2013.01); *H04R 1/1008* (2013.01); *H04R 1/1016* (2013.01)

(56) References Cited

U.S. PATENT DOCUMENTS

| | | |
|---|---|---|
| 2011/0314530 A1 | 12/2011 | Donaldson |
| 2016/0269849 A1* | 9/2016 | Riggs ................ H04S 7/301 |
| 2017/0116995 A1 | 4/2017 | Ady et al. |
| 2017/0332186 A1* | 11/2017 | Riggs ................ H04S 7/304 |
| 2018/0114518 A1* | 4/2018 | Scanlan ............. G10K 11/178 |
| 2018/0307818 A1* | 10/2018 | Yano ................ G01N 29/11 |
| 2019/0189129 A1* | 6/2019 | Arakawa ............ A61B 5/1171 |
| 2019/0213313 A1* | 7/2019 | Koshinaka ............ H04S 7/304 |
| 2019/0258789 A1* | 8/2019 | Koshinaka ............ G10L 17/00 |

OTHER PUBLICATIONS

Van der Leest, "System Aspects of Acoustical Ear Recognition," Master of Science thesis Dept. EE of Eindhoven University of Technology, 2006, 79 pages, found at URL https://research.tue.nl/files/46973977/608455-1.pdf>.

* cited by examiner

HEADSET FOR ACOUSTIC AUTHENTICATION OF A USER

CROSS REFERENCE TO RELATED APPLICATION

This application claims priority to International Application Number PCT/US2018/033455, filed May 18, 2018, which claims priority to U.S. Provisional Patent Application No. 62/508,959, entitled "HEADSET FOR PINNA-BASED ACOUSTIC BIOMETRY", filed on May 19, 2019, the contents of which applications are hereby incorporated by reference in their entireties.

FIELD

The present disclosure relates generally to the field of biometric security for authentication purposes. More particularly, the present disclosure relates to user authentication by a headset with a biometric security system using the ear.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Millions of wired and wireless headsets have been sold around the world. Wireless headsets pair with a host device, such as a computer, smartphone, or tablet, to enable untethered, hands-free communication. As headsets are provided with greater and greater access to the data stored on host devices, security has become an increasing concern. As a result, some headsets include one or more authentication schemes that are intended to preclude an unauthenticated user from utilizing the headset and/or accessing the contents of a paired host device. Unfortunately, these schemes are generally weak or require intensive computing, rendering them unappealing for implementation on a headset.

SUMMARY

In general and in one aspect, a headset for acoustic authentication of a user is provided. According to the present aspect, the headset comprises at least a first microphone to obtain a first input signal, arranged so that during use of the headset, a first acoustic signal received by the first microphone is influenced by the ear of the user. The headset further comprises a second microphone to obtain a second input signal, arranged so that during use of the headset, a second acoustic signal is received by the second microphone, which second acoustic signal is correlated to the first acoustic signal. The headset further comprises a controllable filter, configured to receive the first input signal and the second input signal and to determine at least one filter transfer function from the received first input signal and the received second input signal, and an authenticator, wherein the authenticator is configured to determine a current user acoustic signature from the at least one filter transfer function and to compare the current user acoustic signature with a predefined user acoustic signature and to authenticate the user based on the comparison of the current user acoustic signature with the predefined user acoustic signature.

In a second aspect, a method of acoustic authentication of a user using at least one headset is provided. In the present aspect, the headset comprises at least a first microphone to obtain a first input signal, a second microphone to obtain a second input signal, and a controllable filter. According to the method of the present aspect, a first acoustic signal is received by the first microphone, which first acoustic signal is influenced by the ear of the user, a second input signal is received by the second microphone, which second acoustic signal is correlated to the first acoustic signal, at least one filter transfer function is determined from the received first input signal and the second input signal by the controllable filter, a current user acoustic signature is determined from the at least one filter transfer function, the current user acoustic signature is compared with a predefined user acoustic signature, and the user is authenticated based on the comparison of the current user acoustic signature with the predefined user acoustic signature.

In a further aspect, a headset for acoustic authentication of a user is provided. The headset comprises at least a first microphone to obtain a first input signal, arranged so that during use of the headset, a first acoustic signal received by the first microphone is influenced by the ear of the user, and a second microphone to obtain a second input signal, arranged so that during use of the headset, a second acoustic signal is received by the second microphone, which second acoustic signal is correlated to the first acoustic signal. The headset further comprises a controllable filter, configured to receive the first input signal and the second input signal and to determine at least one filter transfer function from the received first input signal and the second input signal, and an authentication registrar, configured to determine a current user acoustic signature from the at least one filter transfer function and to store the current user acoustic signature as a predefined user acoustic signature.

In yet another aspect, a method of acoustic authentication of a user using at least one headset is provided. In the current method, the headset comprises at least a first microphone to obtain a first input signal, a second microphone to obtain a second input signal, and a controllable filter. According to the current method, a first acoustic signal is received by the first microphone, which first acoustic signal is influenced by the ear of the user, a second input signal is received by the second microphone, which second acoustic signal is correlated to the first acoustic signal, at least one filter transfer function is determined from the received first input signal and the second input signal by the controllable filter, a current user acoustic signature is determined from the at least one filter transfer function, and the current user acoustic signature is stored as a predefined user acoustic signature.

The details of one or more embodiments are set forth in the accompanying drawings and the description below. Other features will be apparent from the description, drawings, and from the claims.

DETAILED DESCRIPTION

Figure 1A:
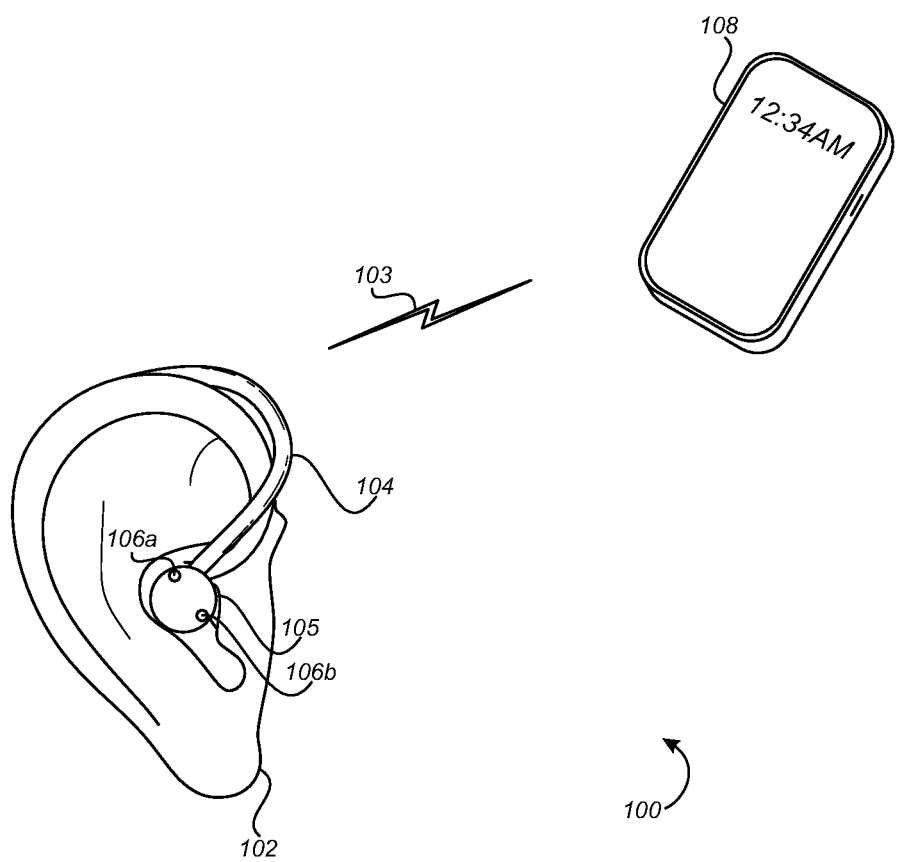
FIGS. 1A-D depict a headset for acoustic authentication of a user in accordance with an embodiment as used in a system for pinna-based acoustic biometry.

Specific embodiments of the invention are here described in detail, below. In the following description of embodiments of the invention, the specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In the following explanation of the present invention according to the embodiments described, the terms "connected to" or "connected with" are used to indicate a data and/or audio connection between at least two components, devices, units, or modules. Such a connection may be direct between the respective components, devices, units, or modules; or indirect, i.e., over intermediate components, devices, units, or modules. The connection may be permanent or temporary; wireless or conductor based.

For example, a data and/or audio connection may be provided over direct connection, a bus, or over a network connection, such as a WAN (wide area network), LAN (local area network), PAN (personal area network), BAN (body area network) comprising, e.g., the Internet, Ethernet networks, cellular networks, such as LTE, Bluetooth (classic, smart, or low energy) networks, DECT networks, ZigBee networks, and/or Wi-Fi networks using a corresponding suitable communications protocol. In some embodiments, a USB connection, a Bluetooth network connection and/or a DECT connection is used to transmit audio and/or data.

In the following description, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between like-named elements. For example, a first element is distinct from a second element, and the first element may encompass more than one element and succeed (or precede) the second element in an ordering of elements.

As individuals further integrate technology into their personal and business activities, devices such as personal computers, tablet computers, mobile phones (e.g., smartphones, etc.), and other wearable devices contain an increasing amount of sensitive data. This sensitive data may include personal information, or proprietary business information. Many individuals rely on hands-free devices, such as headsets, to make phone calls, and interact with their other devices using voice commands. As headset usage increases, headsets are well postured to assume the role of security tokens. In particular, the information gathered by the sensors in a headset may be used to confirm the identify of a wearing user, and better control or manage access to the sensitive data on a host device.

Currently, the primary biometric access control mechanism of headset devices is voiceprint matching using an enrolled fixed trigger or a user-defined trigger. A fixed trigger may be a predetermined phrase selected by, for example, a headset manufacturer that has been selected for its linguistic structure or contents. A user-defined trigger may be any phrase that a user determines should be his or her phrase to control access to his or her headset.

Unfortunately, voiceprint matching currently experiences a crossover error rate (the point at which the false acceptance rate (FAR) and false rejection rate (FRR) are equal for a given threshold value) of approximately 2%. Compared to retinal, iris, and fingerprint biometric mechanisms, which have crossover error rates of approximately 0.0000001%, 0.0007%, and 0.2%, respectively, voiceprint matching can be seen as inferior. Improved voice identification systems have been developed but are memory and compute intensive. These methods tend to be performed in the cloud and require internet access. Accordingly, such methods do not lend themselves to low power devices, such as headsets, which may not maintain persistent Internet connections. Also, acoustic ear canal authentication mechanisms have been developed, but these methods require fully occluding headsets that acoustically seal within the ear canal, such as fully-occluding earbuds. Not only are such systems susceptible to error due to an inadequate seal, but some users find these devices uncomfortable, and prefer or require the ability to hear environmental noises. Still yet, various imaging or pulse monitoring biometric authentication techniques have been proposed, but such techniques require specialized sensors, which substantially increase the cost of a headset, or result in customized, one-off specialty products.

In general, some embodiments of the invention provide a headset, a method, and a computer readable medium for biometrically authenticating a user using, e.g., an "acoustic fingerprint" of the ear, and in particular the user's pinna, or external ear. Amongst humans, due to variations in conchas, tragi, helixes, antihelixes, scaphas, navicular fossas, etc., the pinnas vary widely between individuals. Accordingly, some embodiments described herein relate to systems, devices, and methods for pinna-based biometric security mechanisms that may be deployed to low-power devices, such as headsets. As described in the following, these systems, devices, and methods may exploit manufacturing variances that cause each microphone to be unique. These systems and methods do not require a persistent Internet connection and do not necessarily require specialized sensor hardware. Moreover, headsets employing these systems, devices, and methods may authenticate a user without causing the user discomfort or requiring a sealed ear canal. By creating a signature for a user using that user's headset, a user may be securely authenticated using his or her own unique headset. Moreover, because headsets are designed to be routinely removed and re-attached to a person's head while maintaining consistent positioning between uses, the systems and methods described herein exploit the fixed spatial relationship of a headset's microphones relative to a user's facial structures. Thus, a headset-based authentication mechanism with a crossover error rate that rivals current methods may be deployed to headset devices without additional sensor hardware or substantial expense. Additionally, by combining the systems and methods disclosed herein with other identification or authentication techniques (e.g., password, voiceprint, etc.) overall authentication accuracy may exceed 99%.

In one aspect, a headset for acoustic authentication of a user is provided. According to the present aspect, the headset comprises at least a first microphone to obtain a first input signal, arranged so that during use of the headset, a first acoustic signal received by the first microphone is influenced by the ear of the user. The headset further comprises a second microphone to obtain a second input signal, arranged so that during use of the headset, a second acoustic signal is received by the second microphone, which second acoustic signal is correlated to the first acoustic signal.

In the context of this application, the term "headset" refers to all types of headsets, headphones, and other head worn audio playback devices, such as for example circum-aural and supra-aural headphones, ear buds, in ear headphones, and other types of earphones. The headset may be of mono, stereo, or multichannel setup. A dedicated microphone for recording the user's voice may or may not be provided as part of a headset in the context of this explanation. The headset in some embodiments may comprise an audio processor. The audio processor may be of any suitable type to provide output audio from an input audio signal. For example, the audio processor may be a digital sound processor (DSP).

The first and second microphones may be of any suitable type to convert a received acoustic signal, i.e., one or more received acoustic waves or sound waves, into a corresponding electric signal. In general, the first and second microphones may be of the same or of different type of transducer to convert or "translate" the acoustic signals received into the corresponding electrical signals. For example, at least one of the microphones may be of dynamic, condenser, electret, ribbon, carbon, piezoelectric, fiber optic, laser, or MEMS type.

While the first microphone is arranged to receive a first acoustic signal, the second microphone is arranged to receive a second acoustic signal. The term "acoustic signal" is used in the context of this explanation to refer to the overall acoustic or sound waves received at the respective microphone. The acoustic signal thus may comprise a multitude of components. The first and second acoustic signal in corresponding embodiments may comprise audible and/or inaudible sound waves. In exemplary embodiments, the first and/or second acoustic signals comprise inaudible sound at a frequency above 20 kHz.

According to the present aspect, the first microphone is arranged, so that the first acoustic signal received by the first microphone is influenced by the ear of the user during use of the headset, i.e., when the user wears the headset as intended. In the present context, the term "influenced" is understood as a change in the acoustic signal, caused by the ear of the user. For example, such an influence may be in the form of, reflections, or leaks of the sound from an audio source.

The term "ear" in the preceding definition is understood as to refer to any part of the ear of the user, and in particular the outer ear comprising concha, tragus, helix, antihelix, scapha, navicular fossa, pinna, etc. In one embodiment, the influence stems primarily from the pinna of the user.

According to the present aspect, the second microphone is arranged to receive the second acoustic signal. This second acoustic signal is correlated to the first acoustic signal, such as by originating from one or more common audio sources, such as the user's voice (vocal chords), other persons in the vicinity of the user, or one or more speakers arranged in the headset of external thereof.

In some embodiments, the common audio source is a speaker of the headset. In these embodiments, the common audio source may provide a predefined acoustic stimulus, which, e.g., may be of a played recording. The predefined acoustic stimulus may be of "audible type" comprising noise, music, speech, etc., and combinations thereof. Alternatively or additionally, the predefined acoustic stimulus may comprise at least one non-audible stimulus, e.g., inaudible sound at a frequency of at least 15 kHz and in particular of at least 20 kHz. In further embodiments, the predefined acoustic stimulus is a non-audible stimulus, i.e., comprises only inaudible sound.

In some embodiments, the headset may comprise at least one earpiece or earphone, configured so that sound of the speaker can reach the first and second microphone, providing the predefined acoustic stimulus to the microphone, e.g., directly or through "leakage". In additional or alternative embodiments, the first and second microphones are arranged to receive the predefined acoustic stimulus as part of the first and second acoustic signals.

In other embodiments, the common audio source is the voice of the user. In one example, authentication is performed using the vocal utterances of a wearing user.

The headset according to the present aspect further comprises a controllable filter, configured to receive the first input signal and the second input signal and to determine at least one filter transfer function from the received first input signal and the received second input signal. Furthermore, the headset of this aspect comprises an authenticator, which authenticator is configured to determine a current user acoustic signature from the at least one filter transfer function and to compare the current user acoustic signature with a predefined user acoustic signature and to authenticate the user based on the comparison of the current user acoustic signature with the predefined user acoustic signature.

The controllable filter and the authenticator may be of any suitable type. For example and in some embodiments, the controllable filter and/or the authenticator may be provided in corresponding dedicated circuity. Alternatively and in some embodiments, the controllable filter and/or the authenticator may be provided in software, stored in a memory of the headset, and their respective functionalities provided when the software is executed on a common or one or more dedicated processing units, such as a CPU, microcontroller, or DSP. The controllable filter in some embodiments may be configured to obtain the first input signal and the second input signal directly from the microphones. In other embodiments, the controllable filter may be configured to obtain the first input signal and the second input signal over intermediate components, for example through a noise suppressor, as will be discussed in the preceding in more detail.

The headset in further embodiments certainly may comprise additional components. For example, the headset in one exemplary embodiment may comprise one or more additional microphones, i.e., in addition to the first and second microphones, such as to obtain user audio from the user, additional control electronics to process audio, a wireless communications interface, a central processing unit, one or more housings, and/or a battery.

The terms "input signal" and "input channel" in the present context refer to an analogue or digital representation of audio as electric signals. For example, the input signals described herein may be of pulse code modulated (PCM) type, or any other type of bit stream signal. Each input signal may comprise one channel (mono signal), two channels (stereo signal), or more than two channels (multichannel signal). The input signal(s) may be compressed or not compressed.

As will be apparent from the above, the user according to this aspect is authenticated based on a comparison of the current acoustic signature with a predefined acoustic signature in an "authentication procedure". Authentication in the present context is understood as granting the user access to a resource, such as a computing device, smart phone, tablet, laptop, etc., or access to information, such as stored in a memory of the headset or a connected device. In some embodiments, authentication information is sent upon successful authentication, such as an authentication bit or a cryptographic authentication key, and the receiver uses the authentication information to authenticate the user.

The current acoustic signature is based on the at least one filter transfer function, which in turn is based on the first and second input signals. In view that the underlying first acoustic signal as received by the first microphone during use is influenced by the ear of the user, the above processing "chain" depends correspondingly on the "acoustic signature" or "acoustic fingerprint" of said user.

As discussed in the preceding, the ears of humans, and in particular the outer ear and pinna, due to variations in conchas, tragi, helixes, antihelixes, scaphas, navicular fossas, etc., vary widely between individuals. Accordingly, the present aspect allows secure authentication by determining the impact or influence of these human features on the acoustic characteristics in vicinity of the user's ear.

In addition to the influence of the physical characteristics of the user's ear, the first and second input signals may furthermore and in typical scenarios be influenced by manufacturing variances that cause each microphone to be unique, e.g., to have a characteristic frequency response. While such manufacturing variances easily could be regarded as introducing a disadvantageous error, in the present aspect, the corresponding characteristics may in corresponding embodiments serve to increase the security of the authentication mechanism, namely in view that only a given headset/user combination may allow a successful authentication. In such embodiments and in addition to the user's intrinsic biometric features, i.e., something that the user "is", the user's headset is required for authentication, i.e., something that the user "has". The combination of these two security measures increases the security of the authentication further and makes tampering or falsifying the authentication more difficult.

Certainly and in some embodiments, it may be conceivable to calibrate the microphones to reduce the influence of the frequency response of the microphones.

In one or more embodiments, authenticating the user may include comparing a current signature to a stored or predefined signature. A stored signature may include one or more magnitude vectors. Further, based on the filter transfer function currently generated, a current signature may be generated. The current signature may be generated by applying a transformation and/or function to the current transfer function generated. For example, the current signature may include a magnitude vector that is computed for a transform of the current filter transfer function. After computing the current signature, the current signature may be compared with the stored signature. In one or more embodiments, the current signature may be compared with the stored signature by computing the sum of a mean square error (E) between the current signature and the stored signature. The computed sum of the mean square error, or E, may indicate the confidence of a match between the stored signature and the current signature. Moreover, E may be compared to a predetermined threshold. In one or more embodiments, if E is less than the predetermined threshold, then the current signature is considered to match the stored signature. However, if E is greater than the predetermined threshold, then the current signature is not a match to the stored signature. Accordingly, if E is less than the predetermined threshold, then the user is authenticated, and provided access to the contents of the headset's memory and/or a host device that is paired with the headset.

The authentication procedure may in some embodiments be provided during an initial power up process of the headset and once succeeded be valid for a given time interval or until the user powers off the headset.

Alternatively or additionally and in further embodiments, the authentication procedure may be conducted on a continuous or quasi-continuous basis, e.g., in the latter case in regular or irregular timeout intervals. In these embodiments, the authentication procedure simultaneously serves as a so-called "don/doff detection", i.e., a detection of whether the headset is currently worn, as the authentication would be revoked once the user's ear biometrics would not be determinable anymore from the signals/signature. In some embodiments, at least one further current user acoustic signature is determined and the authentication of the user is revoked based on a comparison of the further current user acoustic signature with the predefined user acoustic signature. For example, in case a further current user acoustic signature is determined from a corresponding further filter transfer function every 5 seconds, it is determinable whether the user still wears the headset. Certainly, the interval may be adapted based on the application and the required security level.

As discussed in the preceding, the first acoustic signal, received by the first microphone is influenced by the ear of the user. In some embodiments, the first and second microphones are arranged so that, during use, an influence of the ear of the user on the second acoustic signal is less than the influence of the ear of the user on the first acoustic signal. In other words, the first acoustic signal is strongly coupled to the user's ear, while the second acoustic signal is less strongly coupled to the user's ear. Consequently, the user's biometric information is more apparent in the first acoustic signal. The second acoustic signal may in corresponding embodiments be "weakly coupled" to the user's ear or show no substantial coupling/influence.

According to some embodiments, the first microphone and the second microphone are arranged in a spaced relationship. According to further embodiments, the first and second microphones are arranged so that, during use, the first and second microphones are external to the user's ear. In other words, the microphones are arranged outwardly in the present embodiments, i.e., facing not the ear canal, but the user's pinna or in more general, are directed towards the space around the user's ear. In one alternative or additional exemplary embodiment, the microphones are arranged on an exterior surface of an earpiece of the headset, i.e., facing outwardly. For example and in case the headset is of "earbud" type, the first and second microphone may be arranged on an exterior surface of at least one earbud.

According to further embodiments, the headset further comprises an earpiece, wherein the first and second microphones are arranged on opposing ends of the earpiece. For example, the first microphone may be arranged on a top end or side of the earpiece, which, during use, faces the helix of the user's ear. Alternatively or additionally, the second microphone may be arranged on a bottom end or side of the earpiece, which, during use, faces the user's earlobe.

In some embodiments, the headset further comprises an earpiece, wherein the first microphone is arranged on an interior surface of the earpiece and the second microphone is arranged on an exterior surface of the earpiece. The present embodiments may be particularly beneficial when the headset is of super-aural or circum-aural type, i.e., in case the headset comprises earphones that rest on the user's ear or enclose the user's ear, respectively. The first microphone, arranged on an interior surface that faces the user's ear, may in this setup be strongly coupled to the user's ear, while the second microphone exhibits substantially no coupling to the user's ear.

As discussed in the preceding, the controllable filter is configured to determine at least one filter transfer function from the received first input signal and the second input signal. In this context, the term "filter transfer function", also referred to as "transfer function", is understood with its ordinary meaning, i.e., a mathematical function giving an output value for each possible value of the input to the filter. The controllable filter may be of any suitable type to determine the filter transfer function. In some embodiments, the controllable filter is configured to determine the at least one filter transfer function by comparing the first input signal with the second input signal. In view that the first input signal comprises the influence of the user's ear, comparing the first and second input signals allows determining the acoustic characteristics of the user's ear, in particular in case of a difference in coupling, i.e., in case that an influence of the ear of the user on the second acoustic signal is less than the influence of the ear of the user on the first acoustic signal. In some embodiments, the controllable filter is a digital controllable filter. In some additional or alternative embodiments, the controllable filter is an adaptive controllable filter and is configured to determine the at least one filter transfer function in an optimization procedure. In this context, the term "adaptive controllable filter", also referred to as "adaptive filter", is understood with its ordinary meaning, i.e., a system with a linear/non-linear filter that has a transfer function adaptively controlled by variable parameters and means to adjust the parameters. For example, the adaptive controllable filter may comprise a Finite Impulse Response (FIR) structure or any other suitable structure. In some embodiments, the adaptive filter may comprise a feedback loop.

In the optimization procedure, the adaptive filter applies an optimization algorithm to determine the at least one filter transfer function with a sufficient quality. For example, the optimization algorithm may be designed to optimize a cost function and/or provided with a predefined rate of convergence. In some embodiments, the optimization algorithm comprises one or more of a Least Mean Squares (LMS) algorithm, a Recursive Lease Mean Squares (RLS) algorithm, a Wiener filter algorithm, a Multidelay Block Frequency Domain Adaptive filter algorithm, or a Matched filter algorithm or Independent Component Analysis.

In alternative or additional embodiments, the controllable filter comprises a machine learning module, wherein the machine learning module is configured to determine the filter transfer function from the first and second input signal. The machine learning module in some embodiments may be configured to operate a Convolutional Neural Network of depth one.

In one or more embodiments, authenticating the user based on the transfer functions may include further deriving a set of features from the first filter transfer function and/or the second filter transfer function. In one or more embodiments, a feature set may be derived using a machine learning algorithm.

As discussed in the preceding, the authenticator is configured to authenticate the user based on a comparison of the current user acoustic signature with a predefined user acoustic signature. While the current user acoustic signature is determined from the at least one filter transfer function, the predefined user acoustic signature may in some embodiments be pre-programmed or setup during a "registration process" using an authentication registrar. The functionality of this process will be explained in more detail in the following discussion of further aspects.

To determine the current user acoustic signature from the at least one filter transfer function, the authenticator may be suitably programmed. In some embodiments, the authenticator is configured to compute a transform of the current user acoustic signature. For example, the transform may comprise at least one of a Discrete Fourier Transform (DFT), and a Wavelet Transform. Certainly, in additional embodiments, the authenticator or registrar may be configured to conduct the same or a similar transform during the registration process.

In view of the precedingly described transform and in alternative or additional embodiments, at least one of the current user acoustic signature and the predefined user acoustic signature may be considered as frequency domain signatures.

In some embodiments, the magnitude of a Discrete Fourier Transform is calculated. The user acoustic signature(s) then correspondingly comprise at least one magnitude (amplitude) vector.

In additional or alternative embodiments, the phase of a Discrete Fourier Transform is calculated. The user acoustic signature(s) then correspondingly comprise at least one phase vector. Certainly, and in some embodiments, it is conceivable that both, a magnitude vector and a phase vector are present in the user acoustic signature(s).

According to some embodiments, comparing the current user acoustic signature with the predefined user acoustic signature comprises determining a distance measure, i.e., a measure of similarity between the two user acoustic signatures. The distance measure may, in additional embodiments be compared with a predefined threshold. The user then may in some embodiments be authenticated in case the threshold is met, i.e., in case the two user acoustic signatures are more similar than the threshold requires. The threshold may be determined a priori so as to minimize the likelihood of false-positives and false-negatives.

In some embodiments, the authenticator is configured to compute the sum of the mean square error E between the current user acoustic signature and the predefined user acoustic signature. If E is below the predefined threshold, it may be asserted that the user is authentic and can be authenticated.

In further embodiments, the authenticator is configured to apply a frequency weighing profile to at least one of the current user acoustic signature and the predefined user acoustic signature before comparing the current user acoustic signature with the predefined user acoustic signature. The frequency weighing profile may be predefined by the manufacturer or may be user-definable. Typically and in some embodiments, the frequency weighing provides that during the comparison of the current user acoustic signature with the predefined user acoustic signature, frequency components that are more significant to the acoustic biometrics of the user, have a higher influence than frequency components that only have little significance.

For example, frequency components that are close to the resonance frequencies of the user's ear may be provided with a higher weight in the weighing profile. For example, a Convolutional Neural Network with a depth of one may be used to determine the weights in the weighing profile.

According to further embodiments, the authenticator is connected to a machine learning module, wherein the machine learning module is configured to generate the frequency weighing profile based on historical signature data.

In some embodiments, the headset comprises more than two microphones. Additional microphones may or may not be used in the described authentication procedure.

In one example and in case of a binaural headset, the first and second microphones may be arranged with a first earpiece, while a third and a fourth microphone are arranged with a second earpiece. The above described authentication procedure is in this exemplary embodiment conducted for both sets of microphones, so that the authentication depends on the acoustic biometrics of both of the user's ears. As will easily be apparent, the present embodiment improves the strength of the authentication further.

According to further embodiments, the authenticator is additionally configured to compare a current vocal utterance sample of the user with a stored user voice profile. The present embodiment increases the strength of the authentication further by conducting voice recognition in addition to the described acoustic biometry. Details of voice recognition technology can be found in Fundamentals of Speaker Recognition, Homayoon Beigi, Springer Science+Business Media, LLC, 2011 incorporated by reference herein. The comparison of the current vocal utterance sample of the user with the stored user voice profile may be based on a predefined voice recognition threshold, comparable to the threshold, discussed in the preceding.

In some embodiments, the threshold used for comparing the current user acoustic signature and/or for comparing the current vocal utterance sample with the stored user voice profile is not fixed, but depends on the respective application, i.e., the threshold is an application threshold value as described in US2016/0253486A1, the contents of which publication is incorporated herein by reference.

For example, in case the user intends to access music or podcasts on her or his connected smart phone, the threshold, i.e., the minimum required probability of identification, may be set lower than in case the user intends to access a banking app. In addition, the threshold may in some embodiments be influenced by other factors, such as user behavior, using user behavior information, as described in US2016/0253486A1.

In further embodiments, the threshold for comparing the user acoustic signatures is selected, so that it can be determined whether the headset is worn or not. This may, e.g., useful in conjunction with the "don/doff detector", described in the preceding. It will be easily apparent that the threshold in this example may be such that rather large differences between the stored user acoustic signature and the current user acoustic signature are acceptable in view that it is only necessary to differentiate a user wearing the headset from the headset being in "free space", i.e., being doffed or being on a surface.

In some embodiments, the headset further comprises a noise suppressor, configured to receive the first and second input signals from the first and second microphones and to provide noise suppressed input signals to the controllable filter. Noise suppression further improves the quality of the authentication process by removing or at least suppressing noise components from the input signals. Audio noise suppression systems and algorithms—also referred to as noise reduction systems and algorithms—are generally known in the art.

In some embodiments, the noise suppressor comprises a stationary noise suppression circuit to remove stationary noise components from the first and second input signals. For example, the stationary noise suppression circuit may comprise a filter to attenuate or remove certain frequency components, which are prone to noise. Alternatively or additionally, the stationary noise suppression circuit may comprise a machine learning algorithm, deep learning algorithm, and/or a statistical signal analysis algorithm.

In further embodiments, the noise suppressor comprises a spatial filter, which spatial filter is configured to suppress or remove non-stationary noise. In one example, the spatial filter is configured for blind source separation on at least one of the first and second input signals. In this context, the term "blind source separation", also referred to as "blind signal separation" is understood with its usual meaning, namely, the separation of a set of source signals (signal of interest and noise signal) from a set of mixed signals, without the aid of information or with very little information about the source signals or the mixing process. Details of Blind Source Separation can be found in Blind Source Separation—Advances in Theory, Algorithms, and Applications, Ganesh R. Naik, Wenwu Wang, Springer Verlag, 2014, incorporated by reference herein.

In some embodiments, the spatial filter is configured as an adaptive filter and, e.g., for closed-loop operation. In further embodiments, the spatial filter is configured to optimize an error function during an optimization procedure. Alternatively or additionally, the spatial filter is configured to operate in the optimization procedure when the controllable filter is not optimizing its filter transfer function, i.e., the spatial filter and the controllable filter operate mutually exclusive in an optimization procedure so that only one of them adapts its filter function at a given time. To control the filters and in further embodiments, a detection circuit for voice and/or echo is provided and configured to alternatively set the controllable filter and the spatial filter to an enabled mode. In some embodiments, the detection circuit is an echo activity detector. In further alternative or additional embodiments, the detection circuit is a voice activity detector.

The stationary noise suppression circuit and/or the spatial filter, as will be apparent from the above, may in corresponding embodiments be provided as dedicated circuity or as software that during operation is executed on a corresponding processor and provides the described functionality.

According to a further aspect, a method of acoustic authentication of a user using at least one headset is provided. According to the present aspect, the headset comprises at least a first microphone to obtain a first input signal, a second microphone to obtain a second input signal, and a controllable filter. The method of the present aspect provides that a first acoustic signal is received by the first microphone, which first acoustic signal is influenced by the ear of the user; a second input signal is received by the second microphone, which second acoustic signal is correlated to the first acoustic signal; at least one filter transfer function is determined from the received first input signal and the second input signal by the controllable filter; a current user acoustic signature is determined from the at least one filter transfer function; the current user acoustic signature is compared with a predefined user acoustic signature; and the user is authenticated based on the comparison of the current user acoustic signature with the predefined user acoustic signature.

The headset according to the present aspect and in further embodiments may be configured according to one or more of the embodiments, discussed in the preceding with reference to the preceding aspects. With respect to the terms used for the description of the present aspect and their definitions, reference is made to the discussion of the preceding aspects.

According to a further aspect, a headset system for acoustic authentication of a user, comprising at least a headset and an authenticator is provided. According to this aspect, the headset comprises at least a first microphone to obtain a first input signal, arranged so that during use of the headset, a first acoustic signal received by the first microphone is influenced by the ear of the user, a second microphone to obtain a second input signal, arranged so that during use of the headset, a second acoustic signal is received by the second microphone, which second acoustic signal is correlated to the first acoustic signal, and a controllable filter, configured to receive the first input signal and the second input signal and to determine at least one filter transfer function from the received first input signal and the second input signal.

The authenticator is configured to determine a current user acoustic signature from the at least one filter transfer function and to compare the current user acoustic signature with a predefined user acoustic signature and to authenticate the user based on the comparison of the current user acoustic signature with the predefined user acoustic signature.

In some embodiments, the authenticator is provided as a component, separate from the headset. In one example, the authenticator is provided in software that can be executed on the user's computer, smart phone, or further device, which then form the "headset system". In some other embodiments, the authenticator is provided as a part of a "cloud system", i.e., a remote server system, which then form the "headset system".

The headset according to the present aspect and in further embodiments may be configured according to one or more of the embodiments, discussed in the preceding with reference to the preceding aspects. With respect to the terms used for the description of the present aspect and their definitions, reference is made to the discussion of the preceding aspects.

According to a further aspect, a headset for acoustic authentication of a user is provided. The headset according to the present aspect comprises at least a first microphone to obtain a first input signal, arranged so that during use of the headset, a first acoustic signal received by the first microphone is influenced by the ear of the user, a second microphone to obtain a second input signal, arranged so that during use of the headset, a second acoustic signal is received by the second microphone, which second acoustic signal is correlated to the first acoustic signal, a controllable filter, configured to receive the first input signal and the second input signal and to determine at least one filter transfer function from the received first input signal and the second input signal, and an authentication registrar, configured to determine a current user acoustic signature from the at least one filter transfer function and to store to current user acoustic signature as a predefined user acoustic signature.

According to the present aspect, an authentication registrar is provided to conduct, e.g., a registration process and to store a predefined user acoustic signature for later authentication of the user, as discussed in the preceding and following description. The authentication registrar may be provided in hardware, e.g., circuitry, software, or a combination thereof.

In some embodiments, the authentication registrar is configured to store the predefined user acoustic signature in a memory of the headset. In some additional or alternative embodiments, the authentication registrar is configured to transmit the predefined user acoustic signature to a remote device, such as the user's smartphone, the user's computer, or a cloud service. In this case, a local storage of the predefined user acoustic signature may or may not be temporary.

In further embodiments, the controllable filter is configured to determine a plurality of filter transfer functions and the authentication registrar is configured to determine the current user acoustic signature from the plurality of filter transfer functions. According to the present embodiments, the accuracy of the predefined user acoustic signature is further improved by determining multiple filter transfer functions. Such multiple filter transfer functions may for example be determined from the same input signal data using different optimization algorithms. In another alternative or additional example, the multiple filter transfer functions are determined from different input signal data, e.g., multiple playbacks of the acoustic stimulus or multiple voice utterances of the user.

In some embodiments, the plurality of filter transfer functions corresponds to a plurality of different wearing positions during use of the headset. The different wearing positions may just slightly differ from each other and still improve the determination of the predefined user acoustic signature.

In some embodiments, voice guidance is provided to the user during the registration process to change the wearing position between taking the corresponding samples.

The headset according to the present aspect and in further embodiments may be configured according to one or more of the embodiments, discussed in the preceding with reference to the preceding aspects. With respect to the terms used for the description of the present aspect and their definitions, reference is made to the discussion of the preceding aspects.

According to a further aspect, a method of acoustic authentication of a user using at least one headset is provided. According to this aspect, the headset comprises at least a first microphone to obtain a first input signal, a second microphone to obtain a second input signal, and a controllable filter. The method of this aspect provides that a first acoustic signal is received by the first microphone, which first acoustic signal is influenced by the ear of the user, a second input signal is received by the second microphone, which second acoustic signal is correlated to the first acoustic signal, at least one filter transfer function is determined from the received first input signal and the second input signal by the controllable filter, a current user acoustic signature is determined from the at least one filter transfer function, and the current user acoustic signature is stored as a predefined user acoustic signature.

The headset according to the present aspect and in further embodiments may be configured according to one or more of the embodiments, discussed in the preceding with reference to the preceding aspects. With respect to the terms used for the description of the present aspect and their definitions, reference is made to the discussion of the preceding aspects.

According to a further aspect, a method for acoustic biometry is provided, the method comprising:

outputting, from a speaker and into an ear of a user, a predetermined acoustic stimulus;

receiving, at a first microphone proximate to the ear of the user, first acoustic feedback of the predetermined acoustic stimulus that is reflected, at least in part, from the ear of the user;

generating a first input signal that includes the first acoustic feedback;

receiving, at a second microphone proximate to the ear of the user, second acoustic feedback of the predetermined acoustic stimulus that is reflected, at least in part, from the ear of the user;

generating a second input signal that includes the second acoustic feedback;

generating a first noise suppressed input signal by performing noise suppression on the first input signal;

generating a second noise suppressed input signal by performing noise suppression on the second input signal;

using the first noise suppressed input signal, the second noise suppressed input signal, and the predetermined acoustic stimulus, performing source separation and generating an echo estimation signal;

responsive to the echo estimation signal, generating a first filter transfer function by adaptively filtering the first noise suppressed input signal;

responsive to the echo estimation signal, generating a second filter transfer function by adaptively filtering the second noise suppressed input signal; and authenticating the user based on the first filter transfer function and the second filter transfer function.

According to a further aspect, a method for acoustic biometry is disclosed. The method includes outputting, from a speaker and into an ear of a user, a predetermined acoustic stimulus. The method also includes receiving, at a first microphone proximate to the ear of the user, first acoustic feedback of the predetermined acoustic stimulus that is reflected, at least in part, from the ear of the user. The method further includes receiving, at a second microphone proximate to the ear of the user, second acoustic feedback of the predetermined acoustic stimulus that is reflected, at least in part, from the ear of the user. Also, the method includes generating a first input signal that includes the first acoustic feedback and generating a second input signal that includes the second acoustic feedback. Still yet, the method includes generating a first noise suppressed input signal by performing noise suppression on the first input signal and generating a second noise suppressed input signal by performing noise suppression on the second input signal. Additionally, the method includes performing source separation and generating an echo estimation signal using the first noise suppressed input signal, the second noise suppressed input signal, and the predetermined acoustic stimulus. Still yet, the method includes, responsive to the echo estimation signal, generating a first filter transfer function by adaptively filtering the first noise suppressed input signal and generating a second filter transfer function by adaptively filtering the second noise suppressed input signal. The user is authenticated based on the first filter transfer function and the second filter transfer function.

According to a further aspect, a method for acoustic biometry is provided, the method comprising:

receiving, at a first microphone proximate to an ear of a user, a first acoustic signal of a vocal utterance of the user that is reflected, at least in part, from the ear of the user;

receiving, at a second microphone proximate to the ear of the user, a second acoustic signal of the vocal utterance of the user that is reflected, at least in part, from the ear of the user;

generating a first voice channel signal by performing noise suppression on the first acoustic signal;

generating a second voice channel signal by performing noise suppression on the second acoustic signal;

generating a resultant acoustic signal by performing spatial signal processing on the first voice channel signal and the second voice channel signal;

detecting speech within the resultant acoustic signal;

in response to detecting the speech within the resultant acoustic signal, generating a first filter transfer function by adaptively filtering the first voice channel signal;

in response to detecting the speech within the resultant acoustic signal, generating a second filter transfer function by adaptively filtering the second voice channel signal; and authenticating the user based on the first filter transfer function and the second filter transfer function.

According to a further aspect, a method for acoustic biometry is disclosed. The method includes receiving, at a first microphone proximate to an ear of a user, a first acoustic signal of a vocal utterance of the user that is reflected, at least in part, from the ear of the user. Also, the method includes receiving, at a second microphone proximate to the ear of the user, a second acoustic signal of the vocal utterance of the user that is reflected, at least in part, from the ear of the user. In addition, the method includes generating a first voice channel signal by performing noise suppression on the first acoustic signal and generating a second voice channel signal by performing noise suppression on the second acoustic signal. Furthermore, the method includes generating a resultant acoustic signal by performing spatial signal processing on the first voice channel signal and the second voice channel signal and detecting speech within the resultant acoustic signal. Still yet, the method includes, in response to detecting the speech within the resultant acoustic signal, generating a first filter transfer function by adaptively filtering the first voice channel signal and generating a second filter transfer function by adaptively filtering the second voice channel signal. The user is authenticated based on the filter transfer function.

Reference will now be made to the drawings in which the various elements of embodiments will be given numerical designations and in which further embodiments will be discussed.

Specific references to components, process steps, and other elements are not intended to be limiting. Further, it is understood that like parts bear the same or similar reference numerals when referring to alternate figures. It is further noted that the figures are schematic and provided for guidance to the skilled reader and are not necessarily drawn to scale. Rather, the various drawing scales, aspect ratios, and numbers of components shown in the figures may be purposely distorted to make certain features or relationships easier to understand.

FIG. 1A shows a system 100 for pinna-based acoustic biometry with a headset 104, configured for acoustic authentication of a user according to one or more embodiments. Although the elements of the system 100 are presented in one arrangement, other embodiments may feature other arrangements, and other configurations may be used without departing from the scope of the invention. For example, various elements may be combined to create a single element. As another example, the functionality performed by a single element may be performed by two or more elements. In one or more embodiments of the invention, one or more of the elements shown in FIG. 1A may be omitted, repeated, and/or substituted. Accordingly, various embodiments may lack one or more of the features shown. For this reason, embodiments of the invention should not be considered limited to the specific arrangements of elements shown in FIG. 1A.

As illustrated in FIG. 1A, the system 100 includes a host device 108 in communication, via a wireless link 103, with the headset 104. Also, as shown in FIG. 1A, the headset 104 is being worn at an ear 102 of a user. As described herein, the user includes a person. The headset 104 may include any body-worn device with a speaker proximate to the ear 102 of the user, and two or more microphones 106, also proximate to the ear 102 of the user, e.g., for monitoring speech of the user or obtaining acoustic signals of a played back predetermined acoustic stimulus 123.

As shown in FIG. 1A, the headset 104 includes an earphone/earpiece 105. In one or more embodiments, the earphone 105 may be a non-occluding earbud. The earphone 105 includes a first microphone 106a and a second microphone 106b located generally central to the pinna, or outer ear, of the ear 102. When the headset 104 is worn by a user, the earphone 105 may rest against the ear 102 of the user, or within two centimeters of the ear 102 of the user. As shown in FIG. 1A, the earphone 105 may be partially inserted into an ear canal of the ear 102, such that the first microphone 106a and the second microphone 106b rest outside an ear canal of the ear 102, i.e., the microphones 106a and 106b are "external" to the user's ear, between the tragus and antihelix of the ear 102. It is contemplated, however, that the first microphone 106a and the second microphone 106b may rest anywhere near the ear 102, such as more proximate to the fossa and/or scapha of the ear 102. In one or more embodiments, the first microphone 106a and the second microphone 106b may be separated by a distance of between 0.5 and 1.5 cm. For example, the first microphone 106a and the second microphone 106b may be spaced apart by approximately 1 cm. As an option, the first microphone 106a and the second microphone 106b may be configured such that the spacing therebetween is across an opening of an ear canal of the ear 102.

As described herein, the host device 108 includes any computing device capable of storing and processing digital information on behalf of a user, such as a user wearing the headset 104. In one or more embodiments, and as depicted in FIG. 1A, the host device 108 comprises a cellular phone (e.g., smart phone, etc.) of the user. However, for reasons that will become clear upon reading the present disclosure, it is understood that the host device 108 may comprise a desktop computer, laptop computer, tablet computer, or other computing device. In one or more embodiments, the host device 108 is communicatively coupled with a network. The network may be a communications network, including a public switched telephone network (PSTN), a cellular network, an integrated services digital network (ISDN), a local area network (LAN), and/or a wireless local area network (WLAN), that support standards such as Ethernet, wireless fidelity (Wi-Fi), and/or voice over internet protocol (VoIP).

As shown in FIG. 1A, the headset 104 and the host device 108 communicate over a wireless link 103. The wireless link 103 may include, for example, a Bluetooth link, a Digital Enhanced Cordless Telecommunications (DECT) link, a cellular link, a Wi-Fi link, etc. In one or more embodiments, via the wireless link 103, the host device 108 may exchange audio, status messages, command messages, data, etc., with the headset 104. For example, the headset 104 may be utilized by the ear 102 to listen to audio (e.g., music, podcasts, voicemails, telephone calls, text-to-speech emails, text-to-speech text messages, voice control messages, etc.) originating at the host device 108. Further, the headset 104 may send commands to the host device 108, that result in, for example, the unlocking of the host device 108, the opening of an application on the host device 108, the retrieval of data by the host device 108, or the authentication of a user at the host device 108.

Figure 1B:
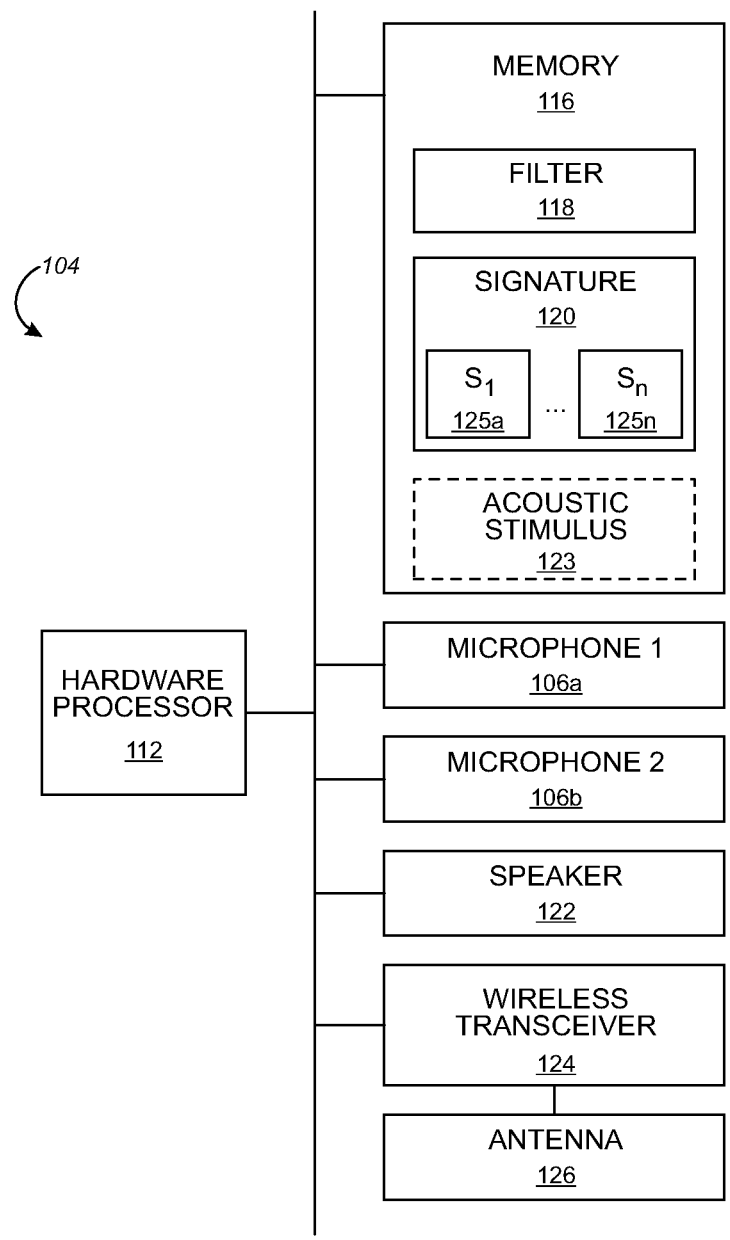

FIG. 1B depicts a block diagram of a headset 104, according to one or more embodiments. Although the elements of the headset 104 are presented in one arrangement, other embodiments may feature other arrangements, and other configurations may be used without departing from the scope of the invention. For example, various elements may be combined to create a single element. As another example, the functionality performed by a single element may be performed by two or more elements. In one or more embodiments of the invention, one or more of the elements shown in FIG. 1B may be omitted, repeated, and/or substituted. Accordingly, various embodiments may lack one or more of the features shown. For this reason, embodiments of the invention should not be considered limited to the specific arrangements of elements shown in FIG. 1B.

As shown in FIG. 1B, the headset 104 includes a hardware processor 112 operably coupled to a memory 116, a wireless transceiver 124 and an accompanying antenna 126, a speaker 122, a first microphone 106a, and a second microphone 106b. In one or more embodiments, the hardware processor 112, the memory 116, the wireless transceiver 124, the microphones 106, and the speaker 122 may remain in communication over one or more communication busses. Although not depicted in FIG. 1B for purposes of simplicity and clarity, it is understood that, in one or more embodiments, the headset 104 may include one or more of a display, a haptic device, and a user-operable control (e.g., a button, slide switch, capacitive sensor, touch screen, etc.).

As described herein, the memory 116 includes any storage device capable of storing information temporarily or permanently. The memory 116 may include volatile and/or non-volatile memory and may include more than one type of memory. For example, the memory 116 may include one or more of SDRAM, ROM, and flash memory. The memory 116 may store pairing information for connecting with the host device 108, user preferences, and/or an operating system (OS) of the headset 104.

In one or more embodiments, the memory 116 may store a predetermined acoustic stimulus 123. The predetermined acoustic stimulus 123 may include any previously stored audio content. For example, the predetermined acoustic stimulus 123 may include a short musical piece and/or a clip of speech, either of which may include a frequency-rich content. Frequency-rich content may have components in all or most of the possible acoustic frequencies, e.g. white-noise. As another example, the predetermined acoustic stimulus 123 may include an inaudible audio clip having a frequency greater than 15 kHz, and in particular greater than 20 kHz. In one or more embodiments of the headset 104 wherein authentication is performed using the vocal utterances of a wearing user, the predetermined acoustic stimulus 123 may be unnecessary and/or unused.

As shown in FIG. 1B, the memory 116 also includes a controllable filter 118, and a user acoustic signature 120, in the following also referred to as "signature". In one or more embodiments, the filter 118 includes one or more mathematical operations for improving, reducing, or enhancing an input signal, such one or more acoustic signals. The acoustic signals may be received via the microphones 106. The acoustic signals may include, for example, a user's vocal utterances and/or acoustic feedback, such as acoustic feedback of the predetermined acoustic stimulus 123. As an option, the controllable filter 118 may include an adaptive filter. The signature 120 is shown to include one or more computed magnitude vectors 125.

The signature 120 in the present embodiment comprises at least one magnitude vector 125. In general, the signature 120 may comprise more than one magnitude vector 125, for example, n−1 different magnitude vectors 125 may be included in the signature 120, where n=the number of microphones 106 of the headset 104. For example, for a headset that includes two microphones 106, only one magnitude vector 125 may be included in the stored signature 120. In case of a headset with three microphones 106, two magnitude vectors 125 are comprised in the stored signature 120. As described herein, input signals of the microphones 106 may be used to isolate the voice of a user wearing the headset 104, and/or perform noise suppression.

Moreover, as described herein below, each magnitude vector 125 may be computed by transforming a corresponding filter transfer function. As discussed in the preceding, the respective filter transfer function may be microphone specific.

In the present embodiment, a filter transfer function is generated based on a first input signal received at the first microphone 106a and on a second input signal received at the second microphone 106b. A corresponding magnitude vector 125 (e.g., magnitude vector 125a) is computed based on the first filter transfer function.

The magnitude vector 125 includes one or more magnitude values. Each of the magnitude values are computed by determining the magnitudes of transform values of one or more frequencies in an input, i.e. the filter transfer function. The transform is conducted using the discrete Fourier Transform (DFT).

In one or more embodiments, the signature 120 is stored during a registration process, then, the user acoustic signature is a predefined user acoustic signature. The signature of the user may include the result of applying a transformation and/or function to each of the generated filter transfer functions. During the registration process, the predetermined acoustic stimulus 123 may be played in the user's ear, or the user wearing the headset 104 may speak a phrase containing one or more words. Based on acoustic signals received at the microphones 106, the magnitude vector 125 of the signature 120 is computed, and then stored as a predefined user acoustic signature. Subsequently, the signature 120 may be compared to one or more newly computed current user audio signatures comprising at least one magnitude vector to determine whether a person wearing the headset is the same person that wore the headset during the registration process.

In one or more embodiments, the memory 116 may include a threshold value. The threshold value may include a minimum or maximum value, such as an error or identity value. During a comparison of the predefined/stored signature 120 to the one or more newly computed magnitude vector(s), i.e., the new or current user acoustic signature, the threshold value may be used to determine with sufficient confidence that the person wearing the headset is the same person that wore the headset during the registration process.

As described herein, the hardware processor 112 processes data, including the execution of applications stored in the memory 116. In one or more embodiments, the hardware processor 112 is a high performance, highly integrated, and highly flexible system-on-chip (SOC), including signal processing functionality such as statistical signal processing, echo cancellation/reduction, and/or gain control. In one or more embodiments, the hardware processor 112 may include a variety of processors (e.g., digital signal processors, etc.), analog-to-digital converters, digital-to-analog converters, etc., with conventional CPUs being applicable. The hardware processor 112 may operate to apply one or more adaptive filters to received audio signals, suppress noise, compute filter transfer functions, transform filter transfer functions, and/or compute magnitude vectors of transformed filter transfer functions.

In one or more embodiments, and as described below, the hardware processor 112 executes applications for generating and storing a signature 120 of a user, as well as subsequently authenticating the user using the signature 120, based on input received via the microphones 106, such as, for example, acoustic signals, including acoustic feedback. Moreover, in response to the successful authentication of the user, the processor may retrieve and present data in accordance with various commands from the user. Data presentation may occur using, for example, the speaker 122. The hardware processor 112 may also provide authentication information to the host device 108.

The headset 104 utilizes the wireless transceiver 124 for transmitting and receiving information over a wireless link with the host device 108. In one or more embodiments, the wireless transceiver 124 may be, for example, a DECT transceiver, Bluetooth transceiver, or IEEE 802.11 (Wi-Fi) transceiver. The antenna 126 converts electric power into radio waves under the control of the wireless transceiver 124, and intercepts radio waves which it converts to electric power and provides to the wireless transceiver 124. Accordingly, by way of the wireless transceiver 124 and the antenna 126, the headset 104 forms a wireless link with the host device 108.

Figure 1D:
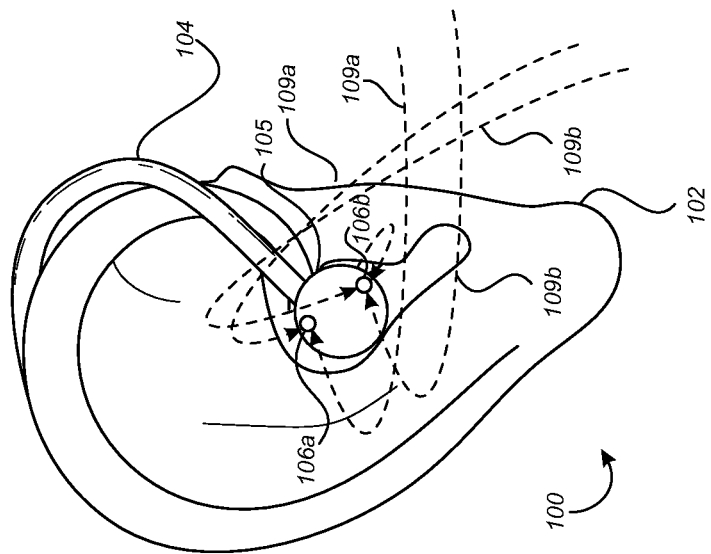
Figure 1C:
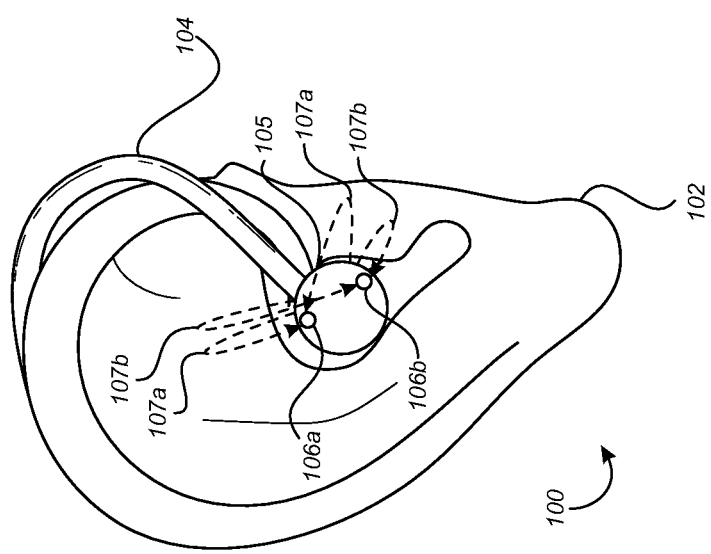

FIG. 1C depicts an embodiment of the system 100 for pinna-based acoustic biometry including headset 104, wherein a user is authenticated using a predetermined acoustic stimulus. As illustrated in FIG. 1C, the headset 104 includes an earphone/earpiece 105 located generally central to the pinna of the ear 102. The earphone 105 may be positioned, at least in part, within the ear canal of the ear 102. As shown in FIG. 1C, a speaker (not shown) of the earphone 105 outputs a predetermined acoustic stimulus towards the ear canal of the ear 102. The predetermined acoustic stimulus is loud enough such that some acoustic energy leaks out of the ear canal of the ear 102 and reaches the microphones 106 after reflecting from the various features of the ear 102. In particular, first acoustic feedback 107a is reflected off the ear 102 and received at the first microphone 106a of the headset 104, and second acoustic feedback 107b is reflected off the ear 102 and received at the second microphone 106b. The acoustic feedback 107 may reflect off any feature of the ear 102 before being picked up by the microphones 106. For example, the acoustic feedback 107 may reflect off one or more of the helix, antihelix, concha, tragus, antitragus, earlobe or lobule, triangular fossa, scapha, and intertragical notch of the ear 102. As a result, the pattern of the acoustic feedback 107 will be specific to the ear 102 of the user.

As will be apparent from FIG. 1C, the first microphone 106a positioned, so that the coupling to the user's ear 102 is stronger than the coupling of the user's ear 102 to the second microphone 106b, i.e., the influence of the user's ear 102 on a first acoustic signal, received by the first microphone 106a, is higher than the influence of the user's ear 102 on a second acoustic signal, received by the second microphone 106b. This is due to the fact that the first microphone 106a is arranged closer to the pinna of the user's ear 102 and also is arranged to face the pinna.

FIG. 1D depicts an embodiment of the system 100 for pinna-based acoustic biometry including headset 104, wherein a user is authenticated using a vocal utterance spoken by the user. In one or more embodiments, the vocal utterance may be a fixed phrase. For example, the phrase may have been previously spoken by the user during a registration process. In one or more embodiments, the vocal utterance may be spoken during a telephone conversation, such that the headset 104 authenticates the user in the background during a phone call, or the vocal utterance may be spoken by the user during an in-person conversation. The vocal utterance is transformed by and reflected from various features of the ear 102, as well as a face of the user, before being received at the microphones 106. In particular, the first microphone 106a receives a first acoustic signal 109a of the vocal utterance, and the second microphone 106b receives a second acoustic signal 109b of the vocal utterance. Again, the acoustic signals 109 may arrive at the microphones 106 after reflecting off of, or being transformed by, any feature of the ear 102 and/or of the user's face. As a result, both the first acoustic signal 109a and the second acoustic signal 109b are unique to the user wearing the headset 104. Corresponding to the embodiment of FIG. 1C, the first microphone 106a positioned, so that the coupling to the user's ear 102 is stronger than the coupling of the user's ear 102 to the second microphone 106b.

With respect to FIGS. 1A-1D, because of variances in manufacturing processes, each of the microphones 106 will exhibit its own unique characteristics. For example, the different microphones 106 may vary with respect to sensitivity, directivity, frequency response, and/or output impedance, all of which may be within permitted manufacturing tolerances, and affect the output signals received from the microphones 106. Accordingly, a computed signature 120 may depend not only on the user's face and ear 102, but also on the microphones 106 used to create the respective signature 120.

For purposes of simplicity and clarity, the headset 104 described herein is generally depicted, such as, for example, in FIGS. 1A, 1C, and 1D, as being worn in-ear (e.g., earbuds, earphones, etc.). However, one of ordinary skill in the art, upon reading the present disclosure, will appreciate that the headset 104 may include any body-worn device including two or more microphones that are, when the headset 104 is worn by a user, disposed proximate to an ear 102 of the user. Accordingly, the headset 104 may include a monaural headset or stereo headset, whether worn over-the-ear (e.g., circum-aural headset, etc.), in-ear, or on-ear (e.g., supra-aural headset, etc.). Moreover, the headset 104 may be worn over-the-head, behind-the-head, or attached to the user's ear(s). As described herein, a headset includes any head-worn audio device that includes a microphone and a speaker. Regardless of the headset type, a headset that attaches to a user's head provides for a substantially stable spatial relationship of the headset's microphones relative to that user's facial features, including the user's ear or ears. In other words, the headset's microphones and/or speaker(s) may be in a fixed position relative to the wearing user's face and pinna. Moreover, headsets are consistently positioned in substantially the same manner between uses or wearing events. Due to this stability and consistency, a user's headset may be used as an efficient and reliable authentication mechanism in circumstances and environments where other devices, such as handheld phones, are entirely unsuitable.

Additional embodiments with circum-aural headsets and supra-aural headsets are discussed in the following with reference to FIGS. 6 and 7.

Figure 2A:
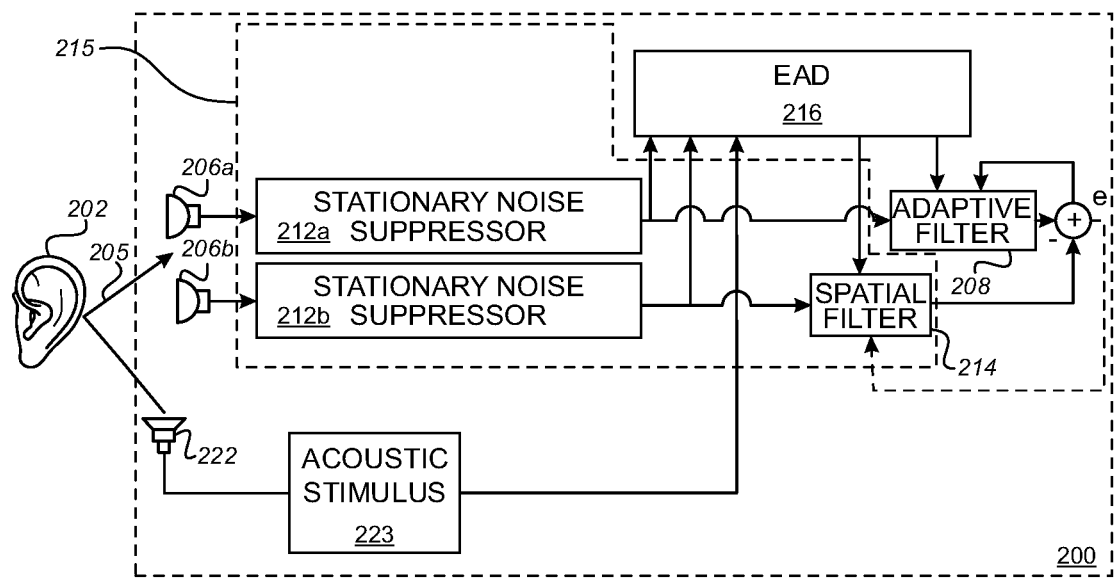
FIGS. 2A and 2B depict block diagrams of headsets in accordance with corresponding embodiments.

FIG. 2A shows a block diagram of a further embodiment of a headset 200 for acoustic authentication of a user. Headset 200 is configured for performing pinna-based acoustic biometry on an ear 202v. Although the elements of the headset 200 are presented in one arrangement, other embodiments may feature other arrangements, and other configurations may be used without departing from the scope of the invention. For example, various elements may be combined to create a single element. As another example, the functionality performed by a single element may be performed by two or more elements. In one or more embodiments of the invention, one or more of the elements shown in FIG. 2A may be omitted, repeated, and/or substituted. Accordingly, various embodiments may lack one or more of the features shown. For this reason, embodiments of the invention should not be considered limited to the specific arrangements of elements shown in FIG. 2A. Elements of the system 200 may be implemented in hardware, software, or combinations thereof.

As shown in FIG. 2A, the headset 200 includes a speaker 222, a first microphone 206a, a second microphone 206b, an echo activity detector (EAD) 216, and an adaptive (controllable) filter 208. The microphones, as shown, are coupled to a noise suppressor 215 having a first stationary noise suppressor 212a, a second stationary noise suppressor 212b, and a spatial filter 214.

Also, the headset 200 is configured to store a predetermined acoustic stimulus 223. During use, the headset 200, via the speaker 222, plays the predetermined acoustic stimulus 223 into an ear 202 of a user wearing the headset 200. The speaker 222 is included in an earphone that is positioned within approximately two centimeters of the ear canal of the ear 202. During use of the headset 200, each of the microphones 206 are proximate to the ear canal of the ear 202, such that each of the microphones 206 receives acoustic feedback 205 of the predetermined acoustic stimulus 223 that is reflected from the ear 202 of the user when played by the speaker 222. Accordingly, each of the microphones 206 receive an acoustic signal and generate a corresponding input signal that is received by the respective stationary noise suppressor 212. As discussed with reference to FIG. 1C and also in this embodiment, the first microphone 206a is more strongly coupled to the user's ear 202 compared to the second microphone 206b, which only shows a weak coupling to the user's ear 202.

Each of the stationary noise suppressors 212 is configured to remove stationary noise from the input signal received from the corresponding microphone 206. Accordingly, each of the stationary noise suppressors 212 separates acoustic feedback of the predetermined acoustic stimulus 223 from background noise in a received input signal. Each of the stationary noise suppressors 212 may include a machine learning module with a corresponding algorithm and/or statistical signal analysis module with a corresponding algorithm to remove or at least attenuate noise. During operation, each of the stationary noise suppressors 212 separates from the input signal of the corresponding microphone 206, the acoustic feedback 205 of the predetermined acoustic stimulus 223 into a first channel, and noise into a second channel. The second channel is discarded in this embodiment. Accordingly, the first stationary noise suppressor 212a may output a first noise suppressed input signal to the adaptive filter 208, and the second stationary noise suppressor 212b may output a second noise suppressed input signal to the spatial filter 214. Although the first stationary noise suppressor 212a and the second stationary noise suppressor 212b are illustrated to comprise independent blocks in FIG. 2A, one of ordinarily skill in the art, upon reading the present disclosure, will appreciate that a single stationary noise suppression block may be configured to receive the input signals from the two or more microphones 206, and output a corresponding number of noise suppressed input signals.

The spatial filter 214 is configured to remove non-stationary noise/interference from one of the noise suppressed input signals. Spatial filter 214 serves to match the microphones 206a and 206b with each other and its initial parameters are set during a factory calibration process. The spatial filter 214 is adaptive and receives feedback, as indicated by the dotted line in FIG. 2A between spatial filter 214 and a summarizer. The spatial filter 214 is operable to perform source separation on the noise suppressed input signal. In other words, for the noise suppressed input signal from stationary noise suppressor 212b, the spatial filter 214 separates the acoustic feedback of the predetermined acoustic stimulus 223 as received at a microphone 206 from non-stationary interference in the signal. In one or more embodiments, the spatial filter 214 may include a beam former that applies a phase shift or time delay to constructively combine the noise suppressed input signals received from the stationary noise suppressors 212. In view that the non-stationary noise typically has the exact same impact on both microphones 206, its impact is cancelled out at the summarizer, which generates the error signal, in view that the output of spatial filter 214 is connected with an inverted input of the summarizer, as shown by the "−" in FIG. 2A.

Echo activity detector (EAD) 216 also receives the noise suppressed signals from the stationary noise suppressors 212 and the acoustic stimulus 223 and estimates the acoustic echo in the feedback signals received at the microphones 206. In essence, EAD 216 determines, when the acoustic stimulus 223 is played back and then triggers the adaptive filter 208 as well as the spatial filter 214. EAD 216 outputs an echo estimation signal to each of the filters 208, 214. The echo estimation signal may be a continuous signal or a discrete, analog or digital signal. EAD 216 comprises corresponding internal filters to filter non-stationary noise (not shown) to determine the echo estimation signal. The echo estimation signal modulates the convergence of the adaptive filter 208, as described below. In other words, the echo estimation signal triggers the operation of the adaptive filter 208 and the spatial filter 214, so that only one of these filters 208, 2014 adapts its filter function at a given time.

Still referring to FIG. 2A, the adaptive filter 208 is coupled to the first noise suppressor 212a and the EAD 216, such that the adaptive filter 208 receives the first noise suppressed input signal from the first noise suppressor 212a and the echo estimation signal from the EAD 216. When the echo estimation signal received from the EAD 216 exceeds a threshold, the adaptive filter 208 operates in an optimization procedure to refine a filter transfer function.

Accordingly, the adaptive filter 208 filters the provided signal using a filter transfer function. The filter transfer function is refined in an iterative optimization procedure. In this example, the respective optimization procedure aims to minimize a cost function error signal (e), which is fed back to the adaptive filter 208. In particular, e is the difference between the result of applying the filter transfer function at the adaptive filter 208 to the noise suppressed input signal from the first noise suppressor 212a and the result of applying the spatial filter 214 to the noise suppressed input signal from the second noise suppressor 212b. The operation of the adaptive filter can be descried as follows:

$$e = F(x1) - F(x2),$$

wherein $F(x1)$ is the filter transfer function of the adaptive filter 208 and $F(x2)$ is the factory-set filter transfer function of the spatial filter 214.

By minimizing the error signal, the resulting filter transfer function is indicative of the influence of the user's ear 202 on the first acoustic signal, i.e., the corresponding "transfer function" of the ear 202 of the user. Certainly, the resulting filter transfer function also comprises an influence of the microphones 206 because of variances during the manufacturing of the microphones 206. While the spatial filter 214 serves to decrease variances between the two microphones 206a and 206b, i.e., components of the filter transfer function that stem from differences in the frequency characteristics between the two microphones, certainly, some microphone-specific influence, which is shared by the two microphones 206 remain. Still yet, because of the unique characteristics of each human pinna, the resulting filter transfer function of the headset 200 also depends on the various features of the ear 202 and thus allows to identify a user using his unique "transfer function".

Figure 3:
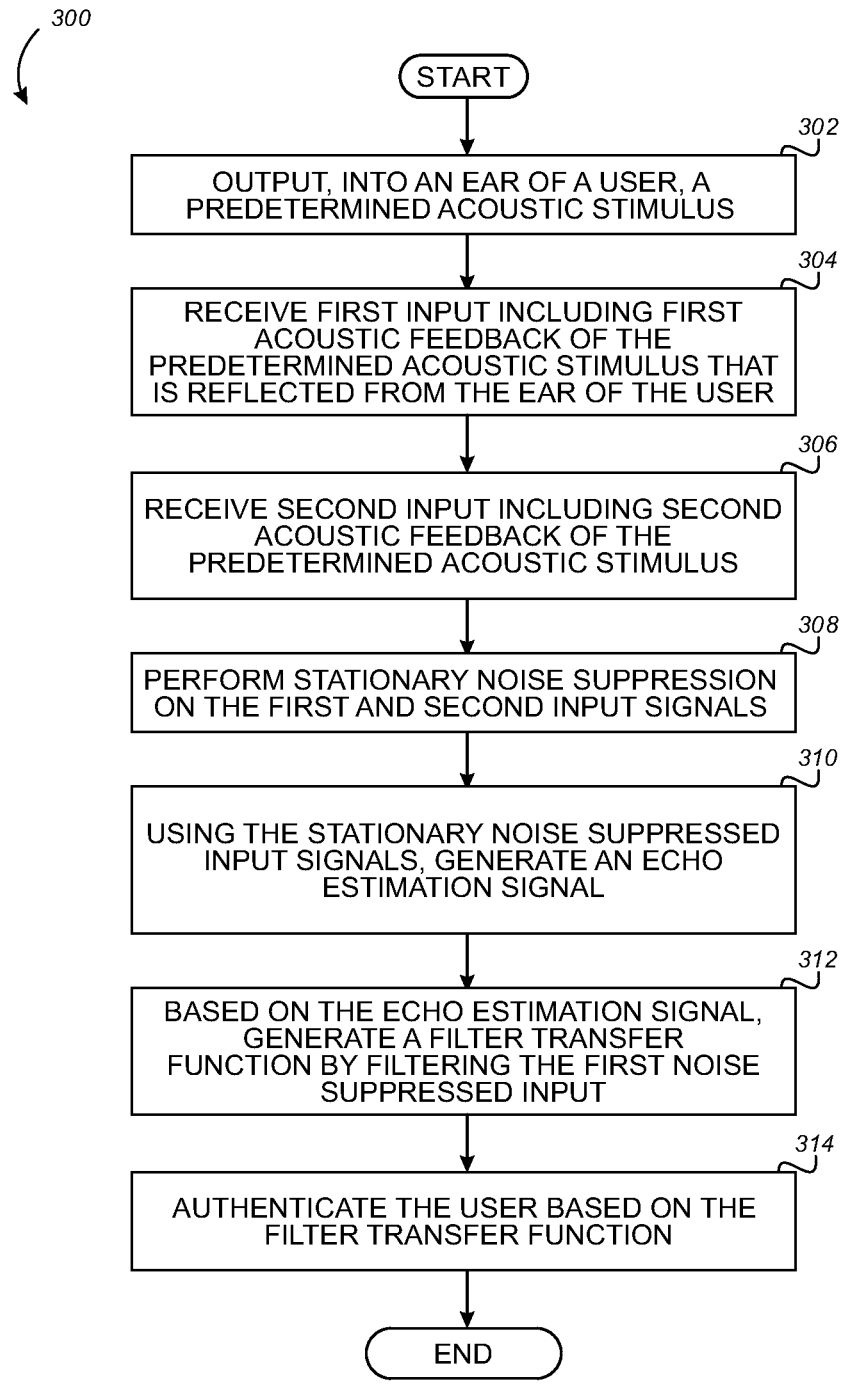
FIG. 3 is a flow diagram showing a method of acoustic authentication accordance the embodiment of FIG. 2A

FIG. 3 shows a flowchart of an embodiment of a method 300 for acoustic authentication of a user, e.g., in this embodiment pinna-based acoustic biometry. The method 300 is executed by headset 200, described hereinabove in reference to FIG. 2A, but may also be used by the headset 104 of the system 100 described in reference to FIGS. 1A, 1B, and 1C. While the steps of the method 300 are presented and described sequentially, one of ordinary skill in the art will appreciate that some or all of the steps may be executed in a different order, may be combined or omitted, and may be executed in parallel. Furthermore, the steps may be performed actively or passively. For example, some steps may be performed using polling or be interrupt driven in accordance with one or more embodiments of the invention.

At step 302, the speaker 222 outputs the predetermined acoustic stimulus 223 into the ear 202 of the user. The predetermined acoustic stimulus 223 may be any previously stored audio content, such as, for example, a short musical piece, a clip of speech, an inaudible audio clip, and/or an audible audio clip containing frequency-rich content. As discussed in the preceding, the speaker 222 is included in an earphone assembly of headset 200. Accordingly, the speaker 222 is positioned within, or within approximately two centimeters of, an ear canal of the user.

Additionally, at step 304, the first microphone 206a receives a first input including first acoustic feedback of the predetermined acoustic stimulus 223. The predetermined acoustic stimulus 223 output from the speaker 222 is reflected as the first acoustic feedback signal from, at least in part, the ear 202 of the user. Responsive to the received input, the first microphone 206a outputs a first input signal that includes the acoustic feedback signal. As described herein above, the external ear, or pinna, varies between individuals due to differences in size, shape, and/or thickness of various features, such as conchas, tragi, helixes, antihelixes, scaphas, navicular fossas, etc.

Also, at step 306, the second microphone 206b receives a second input including a second acoustic feedback signal of the predetermined acoustic stimulus 223. The predetermined acoustic stimulus output 223 from the speaker 222 is reflected as the second acoustic feedback signal from, at least in part, the ear 202 of the user. Responsive to the received input, the second microphone 206b outputs a second input signal that includes the acoustic feedback. In one or more embodiments, the second microphone is positioned proximate to the ear of the user. The second microphone may be included in the earphone assembly of the headset that includes the first microphone. Accordingly, the second microphone may be positioned within, or within approximately two centimeters of, an ear canal of the user. It is noted that the coupling of the second microphone 206*b* to the user's ear 202 is less (weak coupling) compared to the coupling of the first microphone 206*a* to the user's ear 202 (strong coupling). Accordingly, an influence of the user's ear 202 is higher in the first input signal compared with the second input signal.

At step 308, noise suppression is performed on the first input signal and the second input signal. In particular, a first noise suppressed input signal is generated by performing stationary noise suppression on the first input signal, and a second noise suppressed input signal is generated by performing stationary noise suppression on the second input signal. The noise suppression is performed by one or more stationary noise suppressors 212 and by spatial filter 214, described in the context of the system 200 of FIG. 2A, in the preceding. As an option, the noise suppression may be applied to the first input signal separate from the application of the noise suppression to the second input signal. In other words, the first input signal and the second input signal may be independently passed through a noise suppressor to remove any ambient or environmental noise present in each of the first and second input signals.

Moreover, at step 310, an echo estimation signal is generated. An echo activity detection block, such as the EAD 216 described in the context of the headset 200 in the preceding, uses input signals to estimate the acoustic echo in the feedback signals received at the microphones. In this way, an echo estimation signal may be generated and output by the echo activity detection block.

At step 312, based on the echo estimation signal, a filter transfer function is generated by adaptively filtering the first noise suppressed input signal. In particular, responsive to the echo estimation signal exceeding a threshold, the adaptive filter 208 that receives the first noise suppressed input signal is activated. Spatial filter 214 is deactivated when the echo estimation signal exceeds the threshold.

In the present embodiment, adaptively filtering the first noise suppressed input signal includes iteratively adjusting the filter transfer function in an optimization procedure to minimize an error signal that represents a difference between the output of the adaptive filter 208 and the spatial filter 214. The resulting filter transfer function includes one or more coefficients.

Finally, at step 314, the user wearing the headset is authenticated based on the filter transfer function. For the authentication, a current user acoustic signature is determined from the filter transfer function by conducting Discrete Fourier Transforms (DFT) of each filter transfer function, namely:

$$S = mag(DFT(F)),$$

wherein S is a frequency domain acoustic signature, and F is the respective filter transfer function.

One or more, e.g., a set of magnitude vectors results from the DFT, i.e., {S1, S2, ..., Sn}, which collectively is the acoustic signature of the user. The number of magnitude vectors depend on the number of microphones employed in the present procedure.

Once the current user acoustic signature is determined from the filter transfer function, a predefined user acoustic signature, as discussed in the preceding, is retrieved from memory 116. A frequency weighing profile is then applied to the two user acoustic signatures to increase the weight of the frequencies of the two signatures, with have a higher significance for acoustic biometry. The weighing function is determined by a "depth one Convolutional Neural Network" that is trained for an optimal weighting function using a large sample of recordings from several headset wearers, i.e., over time or during a factory training procedure.

After the weighing profile is applied, the sum of the mean square error (E) between the current user acoustic signature and the registered, i.e., the predefined user acoustic signature is computed. As will be apparent, a smaller E indicates higher confidence of a match. If the error is below a predefined threshold, it is asserted that the user during authentication is the same user as during the registration. Accordingly, the user is authenticated by transmitting authentication information to the host device 108. For example, the authentication information may comprise a simple "authenticated" bit or, for increased security, a cryptographic key or password.

Figure 2B:
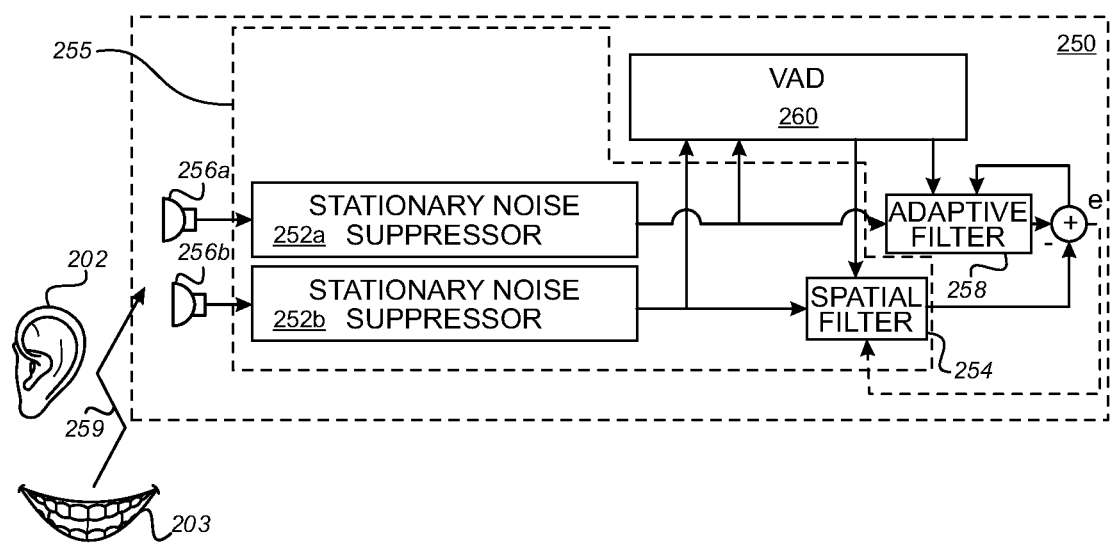

FIG. 2B shows a block diagram of a further embodiment of a headset 250 for acoustic authentication of a user. The headset 250 according to FIG. 2B is again configured for performing pinna-based acoustic biometry on an ear 202. Although the elements of the headset 250 are presented in one arrangement, other embodiments may feature other arrangements, and other configurations may be used without departing from the scope of the invention. For example, various elements may be combined to create a single element. As another example, the functionality performed by a single element may be performed by two or more elements. In one or more embodiments of the invention, one or more of the elements shown in FIG. 2B may be omitted, repeated, and/or substituted. Accordingly, various embodiments may lack one or more of the features shown. For this reason, embodiments of the invention should not be considered limited to the specific arrangements of elements shown in FIG. 2B. Elements of the system 250 may be implemented in hardware, software, or combinations thereof.

As shown in FIG. 2B, the headset 250 includes a first microphone 256*a*, a noise suppressor 255, a second microphone 256*b*, a voice activity detector (VAD) 260, and an adaptive filter 258. As shown, the microphones, are coupled to noise suppressor 255 having a first stationary noise suppressor 252*a*, a second stationary noise suppressor 252*b*, and a spatial filter 254.

During use of the headset 250, each of the microphones 256 are proximate to the ear canal of the ear 202, such that each of the microphones 256 receives an acoustic signal including a vocal utterance 259 spoken from a mouth 203 of a user wearing the headset 250. After being spoken from the mouth 203 of the user and before arriving at the microphones 256, both the face and the ear 202 of the speaking user may transform the vocal utterance 259. As a result, such transformation may be specific to both the speaking user's face and ear 202. Corresponding to the embodiment of FIG. 2B, the first microphone 256*a* is positioned, so that the coupling to the user's ear 202 is stronger than the coupling of the user's ear 202 to the second microphone 256*b*.

As shown in FIG. 2B, the headset 250 comprises a noise suppressor 255, the functionality of which corresponds to the functionality of noise suppressor 215, discussed in the preceding with reference to FIG. 2A, with the exception that instead of acoustic feedback 205 of the predetermined acoustic stimulus 223 being filtered, the stationary noise suppressors 252 are configured to separate a voice signal from background noise.

Although the first stationary noise suppressor 252*a* and the second stationary noise suppressor 252*b* are illustrated to comprise independent blocks in FIG. 2B, one of ordinarily skill in the art, upon reading the present disclosure, will appreciate that a single noise suppression block may be configured to receive the input signals from the two or more microphones 256, and output a corresponding number of voice channel signals.

The spatial filter 254 is—corresponding to spatial filter 214 of FIG. 2A—configured to remove non-stationary noise/interference from one of the noise suppressed input signals. Spatial filter 254 serves to match the microphones 206a and 206b with each other. Spatial filter 254 is adaptive and receives feedback, as indicated by the dotted line in FIG. 2B between spatial filter 524 and a summarizer. Its initial parameters are set during a factory calibration process. In this embodiment, the spatial filter 254 may include a beam former that applies a phase shift or time delay. In other words, the stationary noise suppressors 252 and the spatial filter 254 are together operable to extract and output a single voice signal based on the acoustic signals received by the microphones 256, mitigating any effects of ambient or environmental noise on an authentication process. In view that the non-stationary noise typically has the exact same impact on both microphones 256, its impact is cancelled out at the summarizer, which generates the error signal, in view that the output of spatial filter 254 is connected with an inverted input of the summarizer, as shown by the "-" in FIG. 2B.

The voice activity detector (VAD) 260 is operable to perform speech processing on, and to detect human speech within, the noise suppressed input signals. VAD 260 comprises corresponding internal filters (not shown) to filter non-stationary noise from the noise suppressed input signals. This enhances the speech processing. VAD 260 estimates the presence of human speech in the audio received at the microphones 256. The VAD 260 outputs a voice activity estimation signal to the adaptive filters 258 and the spatial filter 254. The voice activity estimation signal may be a continuous signal or a discrete, analog or digital signal. In one or more embodiments, the voice activity estimation signal modulates the convergence of the adaptive filter 258, as described below. In other words, output of the VAD 260 may activate or deactivate the adaptive filter 258, e.g., such that filter adaptation only occurs when voice is detected within the input signal to the VAD 260. Corresponding to the embodiment of FIG. 2A, the operation of adaptive filter 258 and spatial filter 254 are controlled in a mutually exclusive way by the voice activity estimation signal, so that only one of the filters 258, 254 is adapts its filter function at the same time.

Still referring to FIG. 2B, the adaptive filter 258 is coupled to the first stationary noise suppressor 252a and the VAD 260, such that the adaptive filter 258 receives the input (voice) signal from the first stationary noise suppressor 252a and the voice activity estimation signal from the VAD 260. When the voice activity estimation signal received from the VAD 260 exceeds a threshold, the adaptive filter 258 operates in an optimization procedure to refine is respective transfer function and converge on its one or more coefficients.

Accordingly, the adaptive filter 258 filters the provided signal using a filter transfer function. The filter transfer function is refined in an iterative optimization procedure. In this example, the respective optimization procedure aims to minimize a cost function error signal (e), which is fed back to the adaptive filter 258. In particular, e is the difference between the result of applying the filter transfer function at the adaptive filter 258 to the noise suppressed input signal from the first noise suppressor 252a and the result of applying the spatial filter 254 to the noise suppressed input signal from the second noise suppressor 252b. The operation of the adaptive filter can be descried as follows:

$$e = F(x1) - F(x2),$$

wherein F(x1) is the filter transfer function of the adaptive filter 258 and F(x2) is the factory-set filter transfer function of the spatial filter 254.

By minimizing the error signal, the resulting filter transfer function is indicative of the influence of the user's ear 202 on the first acoustic signal. Certainly, the resulting filter transfer function also comprises an influence of the microphones 256 because of variances during the manufacturing of the microphones 256. While the spatial filter 254 serves to decrease variances between the two microphones 256a and 256b, i.e., components of the filter transfer function that stem from differences in the frequency characteristics between the two microphones, certainly, some microphone-specific influence, which is shared by the two microphones 256 remain. Still yet, because of the unique characteristics of each human pinna, the resulting filter transfer function of the headset 250 also depends on the various features of the ear 202.

Figure 4:
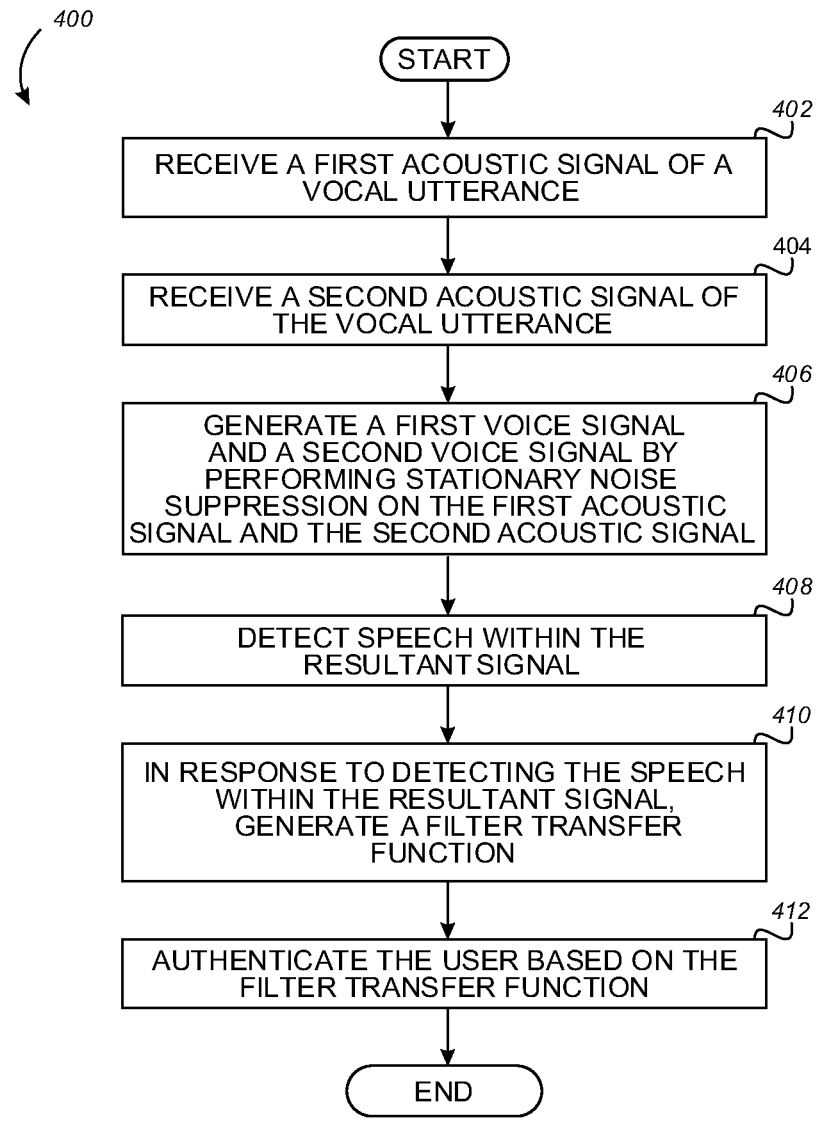
FIG. 4 is a flow diagram showing a method of acoustic authentication in accordance the embodiment of FIG. 2B.

FIG. 4 shows a flowchart of an embodiment of a method 400 for acoustic authentication of a user, e.g., in this embodiment pinna-based acoustic biometry. The method 400 is executed by headset 250, described hereinabove in reference to FIG. 2B, but may also be used by headset 104 of the system 100, described in reference to FIGS. 1A, 1B, and 1D. While the steps of the method 400 are presented and described sequentially, one of ordinary skill in the art will appreciate that some or all of the steps may be executed in a different order, may be combined or omitted, and may be executed in parallel. Furthermore, the steps may be performed actively or passively. For example, some steps may be performed using polling or be interrupt driven in accordance with one or more embodiments of the invention.

At step 402, first microphone 256a receives a first acoustic signal. In this embodiment, the first acoustic signal includes a vocal utterance of a user. Also, at step 404, the second microphone receives 256b a second acoustic signal. The second acoustic signal includes the vocal utterance of the user. Both the first microphone 256a and the second microphone 256b are proximate to an ear 202 of the user. Thus, the first acoustic signal and the second acoustic signal have been reflected, at least in part, from the ear 202 of the user prior to reaching the first microphone 256a and second microphone 256b, respectively. Further, the first acoustic signal and the second acoustic signal may be transformed in some manner by the user's face prior to reaching the first microphone 256a and second microphone 256b, respectively. It is noted that the coupling of the second microphone 256b to the user's ear 202 is less (weak coupling) compared to the coupling of the first microphone 256a to the user's ear 202 (strong coupling). Accordingly, an influence of the user's ear 202 is higher in the first input signal compared with the second input signal.

At step 406, a first (voice) signal is generated by performing noise suppression on the first acoustic signal, and a second (voice) signal is generated by performing stationary noise suppression on the second acoustic signal. The noise suppression is performed by the stationary noise suppressors 252 and by spatial filter 254, described in the context of the system 250 of FIG. 2B, above. As an option, the stationary noise suppression may be applied to the first acoustic signal separate from the application of the stationary noise suppression to the second acoustic signal or the spatial filtering.

In other words, the first acoustic signal and the second acoustic signal may be independently passed through a stationary noise suppressor to remove any ambient or environmental stationary noise present in each of the first and second acoustic signals.

At step 408, speech is detected within the resultant acoustic signal. The speech is detected by the voice activity detector 260 described in the preceding in reference to FIG. 2B. The voice activity detector outputs a voice activity estimation signal that estimates the presence of human speech in the audio received at the microphones at steps 402-404.

Further, at step 410, in response to detecting the speech within the resultant acoustic signal, a filter transfer function is generated by adaptively filtering the first voice channel signal. In particular, responsive to the voice activity estimation signal exceeding a threshold, the adaptive filter 258 that receives the first signal is activated. In this way, the voice activity estimation signal may be used to modulate the convergence to the coefficients of the respective filter transfer function of the adaptive filter 258. In other words, the voice activity estimation signal triggers the operation of the adaptive filter 258. Spatial filter 254 is deactivated when the voice activity estimation signal exceeds the threshold.

In this embodiment, adaptively filtering the first signal includes iteratively adjusting a filter transfer function in an optimization procedure to minimize an error signal that represents a difference between the output of the adaptive filter 258 and the spatial filter 254. The resulting filter transfer function may include one or more coefficients.

Additionally, at step 412, the user is authenticated based on the filter transfer function. For the authentication, a current user acoustic signature is determined from the filter transfer function by conducting Discrete Fourier Transforms (DFT) of each filter transfer function, namely:

$$S = mag(DFT(F)),$$

wherein S is a frequency domain acoustic signature, and F is the respective filter transfer function.

One or more, e.g., a set of magnitude vectors results, i.e., {S1, S2, . . . , Sn}, which collectively is the acoustic signature of the user. As discussed in the preceding, the number of magnitude vectors depend on the number of microphones employed in the process.

Once the current user acoustic signature is determined, the predefined user acoustic signature, as discussed in the preceding, is retrieved from memory 116. A frequency weighing profile is then applied to the two user acoustic signatures to increase the weight of the frequencies of the two signatures, with have a higher significance for acoustic biometry. In this embodiment, the weighing function is predefined in a lookup table.

After the weighing profile is applied, the sum of the mean square error (E) between the current user acoustic signature and the registered, i.e., the predefined user acoustic signature is computed. As will be apparent, a smaller E indicates higher confidence of a match. If the error is below a predefined threshold, it is asserted that the user during authentication is the same user as during the registration. Accordingly, the user is authenticated by transmitting authentication information to the host device 108. For example, the authentication information may comprise a simple "authenticated" bit or, for increased security, a cryptographic key or password.

Figure 5:
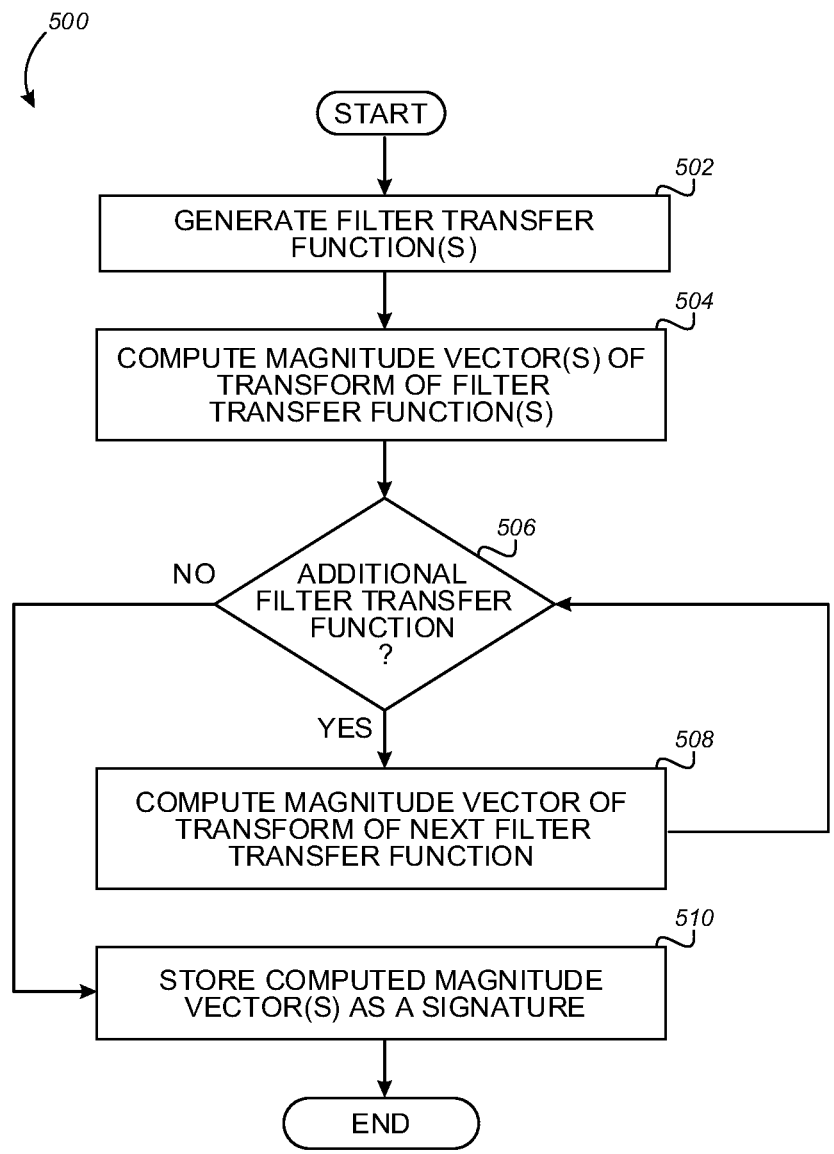
FIG. 5 is flow diagram showing a method for signature registration in accordance with an embodiment.

FIG. 5 shows a flowchart of a method 500 for signature registration using a headset for acoustic authentication of a user in accordance with one or more embodiments. While the steps of the method 500 are presented and described sequentially, one of ordinary skill in the art will appreciate that some or all of the steps may be executed in a different order, may be combined or omitted, and may be executed in parallel. Furthermore, the steps may be performed actively or passively. For example, some steps may be performed using polling or be interrupt driven in accordance with one or more embodiments of the invention. In one or more embodiments, the method 500 may be carried out by a headset, such as the headsets 200 and 250, described hereinabove in reference to the embodiments FIGS. 2A and 2B, and the headset 104 of the system 100, described in reference to the embodiments FIGS. 1A, 1B, 1C, and 1D.

At step 502, one or more filter transfer functions are generated. To do so, the acoustic stimulus 223 is provided or the user is asked to provide a vocal utterance corresponding to the preceding discussions of FIGS. 2A and 2B. After receiving the acoustic signal as discussed in the preceding with reference to the aspect of authentication, one or more filter transfer functions may be generated by an adaptive filter, such as the adaptive filters 208 or 258, described in the context of FIGS. 2A and 2B, above. In one or more embodiments, a dedicated filter transfer function may be generated for a number of n−1 microphones of a headset, where n is the number of microphones used for authentication. These filter transfer functions could be determined with a single adaptive filter sequentially or a corresponding number of adaptive filters.

Generating each filter transfer function comprises calculating one or more coefficients of the filter transfer function for minimizing an associated error signal, as discussed in the preceding.

Moreover, at step 504, the filter transfer functions generated at step 502, are transformed using a Discrete Fourier Transform (DFT), and magnitude vectors of the transforms are computed. Accordingly, the magnitude vectors may include one or more magnitude values, where each of the magnitude values may be computed by determining the magnitudes of transform values of one or more frequencies in the filter transfer function.

At step 506, it is determined whether any additional filter transfer functions are to be generated. For example, a user may like to add more filter functions to further "train" the system, i.e., to improve the authentication procedure. The user at step 506 is asked by a voice prompt, whether she/he would like to add a further transfer function, such as after minimally repositioning the headset. The user then confirms by a corresponding voice command.

If no additional filter transfer functions were generated, then the method 500 proceeds to step 510. However, if the user decides to conduct additional training, then the method 500 proceeds to step 508. At step 508, a further acoustic stimulus 223 is provided or the user is asked again to provide a vocal utterance. The next filter transfer function is then determined, and one or more magnitude vectors of the transform are computed. Again, DFT is used to transform the filter transfer function. After computing the magnitude vector of the next filter transfer function, the method 500 again returns to step 506, and it is determined whether additional transfer functions are to be generated (e.g., a third filter transfer function, a fourth filter transfer function, etc.). Accordingly, the method 500 iterates, between steps 504 and 508, to compute separate magnitude vectors for each of the filter transfer functions generated at step 502.

At step 510, after the magnitude vectors have been computed, the magnitude vectors are stored. The magnitude vectors are stored as a predefined user acoustic signature. As noted above, because each of the magnitude vectors may be both pinna- and microphone-dependent, this signature may be used to authenticate a given user to use a given headset and prevent others from using that headset. Thus, at a subsequent time, steps 502-508 may be performed on one or more acoustic signals received at one or more microphones to generate a current signature, where the current signature is compared to the signature stored at step 510, i.e., the predefined or stored user acoustic signature.

Figure 6:
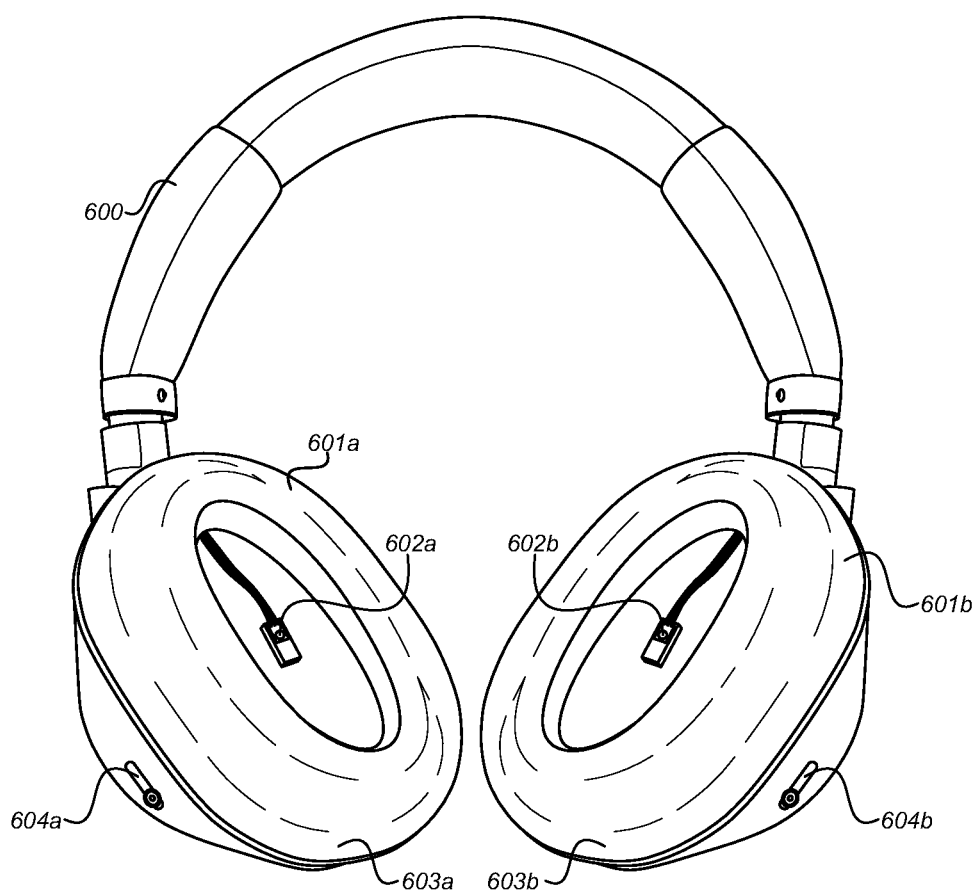
FIG. 6 shows a further embodiment of a headset for acoustic authentication.

FIG. 6 shows a further embodiment of a headset 600 for acoustic authentication. The headset 600 is of circum-aural type and comprises two earphones 601a and 601b that during use enclose the user's ears. Each earphone 601a, 601b comprises a first microphone 602 and a second microphone 604. As will be apparent from the FIG., the first microphones 602 are arranged on interior surfaces of the respective earphones 601a and 601b, while the second microphones 604 are arranged on exterior surfaces of the respective earphones 601a and 601b.

Correspondingly, the respective first microphone 602 during use receives a first acoustic signal that is strongly influenced by the user's ear—in particular by the user's outer ear—while the respective second microphone 604 will in use receive a second acoustic signal that is substantially not influenced by the user's ear, certainly, in dependence of the quality of the ear cushions 603, which isolate the ear area from the outside.

The internal configuration of the embodiment of FIG. 6 corresponds to the embodiment, discussed in the preceding with reference to FIG. 2B, while the operation corresponds to the discussed embodiment of FIG. 4 with the following exceptions.

In view that in the present embodiment, microphones 602, 604 are provided for each ear of the user, the described registration and authentication procedures are conducted for each ear. Consequently, during registration, a left ear predefined user acoustic signature and a right ear predefined user acoustic signature are stored. During authentication, a left ear current acoustic signature and a right ear current acoustic signature is determined and compared with the respective stored/predefined user acoustic signatures. Only if the threshold is met for both, i.e., left and right signatures, the user is authenticated.

Figure 7:
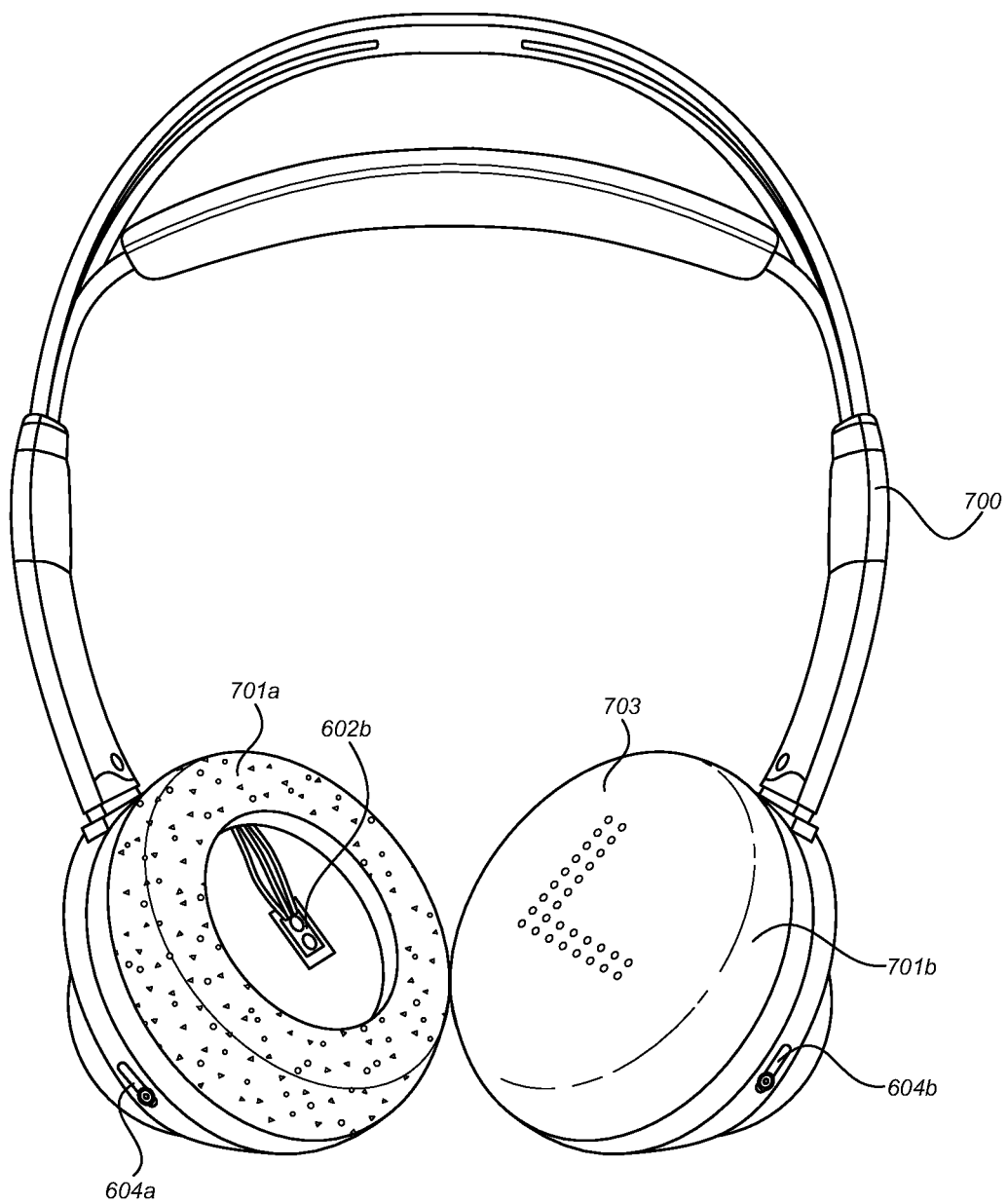
FIG. 7 shows a further embodiment of a headset for acoustic authentication.

FIG. 7 shows a further embodiment of a headset 700 for acoustic authentication. The headset 700 corresponds to the headset 600 as discussed with reference to FIG. 6 with the exception that headset 700 is a supra-aural headset, i.e., resting on the user's ear during use. FIG. 7 shows one earphone 701b with cover 703 while a cover is not shown on the other earphone 701a. Both earphones 701a and 701b are identical.

The internal setup and functionality of the headset 700 of FIG. 7 corresponds to the headset 600, discussed with reference to FIG. 6, which the exception that, due to the supra-aural configuration of headset 700, the second microphones 604 use receive a second acoustic signal that is somewhat influenced by the user's ear, although this coupling is relatively weak.

While the invention has been illustrated and described in detail in the drawings and foregoing description, such illustration and description are to be considered illustrative or exemplary and not restrictive; the invention is not limited to the disclosed embodiments. For example, it is possible to operate the invention in any of the preceding embodiments, wherein instead of separate noise suppressors 212a, 212b, 252a, 252b for each of the microphones 206a, 206b, 256a, 256b, a single noise suppressor is provided, which processes the signals of the microphones 206a, 206, 256a, 256b, instead of the predefined user acoustic signature being retrieved from memory 116, the predefined user acoustic signature being retrieved from host device 108, a cloud service, or a server, more than two or four microphones are provided in the headset, authenticating the user based on the transfer function(s) includes further deriving a set of features from the filter transfer function(s), a feature set may be derived using a machine learning algorithm and/or instead of or in addition to obtaining/storing user acoustic signatures with magnitude vectors, obtaining/storing user acoustic signatures with phase vectors.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit may fulfill the functions of several items recited in the claims.

The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

What is claimed is:

1. A headset for acoustic authentication of a user, comprising at least a first microphone to obtain a first input signal, arranged so that during use of the headset, a first acoustic signal received by the first microphone is influenced by the ear of the user;

a second microphone to obtain a second input signal, arranged so that during use of the headset, a second acoustic signal is received by the second microphone, which second acoustic signal is correlated to the first acoustic signal;

a controllable filter, configured to receive the first input signal and the second input signal and to determine at least one filter transfer function from the received first input signal and the second input signal; and an authenticator, configured to determine a current user acoustic signature from the at least one filter transfer function and to compare the current user acoustic signature with a predefined user acoustic signature and to authenticate the user based on the comparison of the current user acoustic signature with the predefined user acoustic signature; wherein the authenticator is configured to apply a frequency weighing profile to at least one of the current user acoustic signature and the predefined user acoustic signature before comparing the current user acoustic signature with the predefined user acoustic signature.

2. The headset of claim 1, wherein the first microphone and the second microphone are arranged so that, during use, an influence of the ear of the user on the second acoustic signal is less than the influence of the ear of the user on the first acoustic signal.

3. The headset of claim 1, wherein the first and second microphones are arranged in a spaced relationship.

4. The headset of claim 1, wherein the first and second microphones are arranged so that, during use, the first and second microphones are external to the user's ear.

5. The headset of claim 1, wherein the controllable filter is configured to determine the at least one filter transfer function by comparing the first input signal with the second input signal.

6. The headset of claim 1, wherein the controllable filter is an adaptive controllable filter and is configured to determine the at least one filter transfer function in an optimization procedure.

7. The headset of claim 1, further comprising a speaker to provide a predefined acoustic stimulus, wherein the first and second microphones are arranged to receive the predefined acoustic stimulus in the first and second acoustic signals.

8. The headset of claim 7, wherein the predefined acoustic stimulus is a non-audible stimulus.

9. The headset of claim 1, wherein at least one of the current user acoustic signature and the predefined user acoustic signature are frequency domain signatures and comprise at least one magnitude vector.

10. The headset of claim 1, wherein at least one of the current user acoustic signature and the predefined user acoustic signature are frequency domain signatures and comprise at least one phase vector.

11. The headset of claim 1, wherein the authenticator is connected to a machine learning module, wherein the machine learning module is configured to generate the frequency weighing profile based on historical signature data.

12. The headset of claim 1, further comprising a noise suppressor, configured to receive at least one of the first and second input signals from the first and second microphones and to provide at least one noise suppressed input signal to the controllable filter.

13. The headset of claim 12, wherein the noise suppressor comprises a stationary noise suppression circuit.

14. The headset of claim 12, wherein the noise suppressor comprises a spatial filter, which spatial filter is configured to suppress non-stationary noise.

15. The headset of claim 14, wherein the spatial filter is configured for performing blind source separation on at least one of the first and second input signals.

16. A method of acoustic authentication of a user using at least one headset, which headset comprises at least a first microphone to obtain a first input signal; a second microphone to obtain a second input signal; and a controllable filter; comprising:
  receiving a first acoustic signal by the first microphone, which first acoustic signal is influenced by the ear of the user;
  receiving a second input signal by the second microphone, which second acoustic signal is correlated to the first acoustic signal;
  determining at least one filter transfer function from the received first input signal and the second input signal by the controllable filter;
  determining a current user acoustic signature from the at least one filter transfer function;
  applying a frequency weighing profile to at least one of the current user acoustic signature and a predefined user acoustic signature;
  comparing the current user acoustic signature with the predefined user acoustic signature; and
  authenticating the user based on the comparison of the current user acoustic signature with the predefined user acoustic signature.

17. A non-transitory computer readable media embodying instructions executable by a processor to perform functions comprising:
  receiving a first acoustic signal using a first microphone, which first acoustic signal is influenced by an ear of a user;
  receiving a second acoustic signal using a second microphone, which second acoustic signal is correlated to the first acoustic signal;
  determining, using a controllable filter, at least one filter transfer function from the received first acoustic signal and the second acoustic signal;
  determining a current user acoustic signature from the at least one filter transfer function;
  applying a frequency weighing profile to at least one of the current user acoustic signature and a predefined user acoustic signature;
  comparing the current user acoustic signature with the predefined user acoustic signature; and
  authenticating the user based on the comparison of the current user acoustic signature with the predefined user acoustic signature.

18. A headset for acoustic authentication of a user, comprising at least
  a first microphone to obtain a first input signal, arranged so that during use of the headset, a first acoustic signal received by the first microphone is influenced by an ear of the user;
  a second microphone to obtain a second input signal, arranged so that during use of the headset, a second acoustic signal is received by the second microphone, which second acoustic signal is correlated to the first acoustic signal;
  a controllable filter, configured to receive the first input signal and the second input signal and to determine at least one filter transfer function from the received first input signal and the second input signal; and
  an authentication registrar, configured to determine a current user acoustic signature from the at least one filter transfer function, to apply a frequency weighing profile to at least the current user acoustic signature, and to store to current user acoustic signature as a predefined user acoustic signature.

19. The headset of claim 18, wherein the controllable filter is configured to determine a plurality of filter transfer functions and the authentication registrar is configured to determine the current user acoustic signature from the plurality of filter transfer functions.

20. The headset of claim 19, wherein the plurality of filter transfer functions corresponds to a plurality of different wearing positions during use of the headset.

\* \* \* \* \*